United States Patent
Park et al.

(10) Patent No.: US 9,864,412 B2
(45) Date of Patent: Jan. 9, 2018

(54) FLEXIBLE DISPLAY APPARATUS

(71) Applicant: LG Display Co., Ltd., Seoul (KR)

(72) Inventors: Sang Dae Park, Goyang-si (KR); Choun Sung Kang, Goyang-si (KR); Yong Seok Lee, Paju-si (KR); Chang Yoon Park, Ansan-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/981,662

(22) Filed: Dec. 28, 2015

(65) Prior Publication Data
US 2016/0363960 A1 Dec. 15, 2016

(30) Foreign Application Priority Data
Jun. 15, 2015 (KR) .................. 10-2015-0084573

(51) Int. Cl.
G06F 1/16 (2006.01)
G09F 9/30 (2006.01)
G09F 15/00 (2006.01)

(52) U.S. Cl.
CPC .......... *G06F 1/1656* (2013.01); *G06F 1/1652* (2013.01); *G09F 9/301* (2013.01); *G09F 15/0062* (2013.01)

(58) Field of Classification Search
CPC ...... G06F 1/1656; G06F 1/1652; G09F 11/00; G09F 11/22; G09F 11/18; G09F 2013/0436
See application file for complete search history.

(56) References Cited

U.S. PATENT DOCUMENTS

| | | | |
|---|---|---|---|
| 2005/0040962 A1* | 2/2005 | Funkhouser | G06F 1/1601 340/815.4 |
| 2006/0107566 A1* | 5/2006 | Van Rens | G09F 9/35 40/515 |
| 2007/0180745 A1* | 8/2007 | Ofuji | G03B 21/58 40/601 |
| 2007/0241002 A1* | 10/2007 | Wu | G06F 1/1601 206/150 |
| 2008/0212271 A1 | 9/2008 | Misawa | |
| 2012/0002357 A1* | 1/2012 | Auld | G09F 9/33 361/679.01 |
| 2012/0204453 A1* | 8/2012 | Jung | G09F 9/301 40/517 |
| 2014/0247544 A1* | 9/2014 | Ryu | G09F 11/18 361/679.01 |
| 2014/0268532 A1* | 9/2014 | Nicol | G09F 15/0062 361/679.26 |
| 2014/0380186 A1* | 12/2014 | Kim | G09G 3/2092 715/746 |

(Continued)

FOREIGN PATENT DOCUMENTS

KR 10-2012-0093665 A 8/2012

*Primary Examiner* — Hoa C Nguyen
*Assistant Examiner* — Keith Depew
(74) *Attorney, Agent, or Firm* — Birch, Stewart, Kolasch & Birch, LLP

(57) ABSTRACT

A flexible display apparatus includes a frame module having a sliding path to guide the winding or unwinding of a flexible display module, and a sliding shaft configured to slide along a spiral sliding path via vertical movement of the flexible display module. The flexible display apparatus makes it easy to wind or unwind a large flexible display panel.

31 Claims, 21 Drawing Sheets

(56) References Cited

U.S. PATENT DOCUMENTS

| | | | |
|---|---|---|---|
| 2015/0009636 A1* | 1/2015 | Jeong | B65H 18/10 |
| | | | 361/749 |
| 2015/0316962 A1 | 11/2015 | Howes | |
| 2016/0163242 A1* | 6/2016 | Lee | G09F 9/301 |
| | | | 40/584 |
| 2016/0231843 A1* | 8/2016 | Kim | G06F 3/0412 |
| 2016/0363960 A1* | 12/2016 | Park | G06F 1/1656 |
| 2016/0374228 A1* | 12/2016 | Park | G09F 9/301 |
| 2017/0023978 A1* | 1/2017 | Cho | G02F 1/133305 |

* cited by examiner 131-1, 131-2

FLEXIBLE DISPLAY APPARATUS

CROSS REFERENCE TO RELATED APPLICATIONS

This application claims the benefit of the Korean Patent Application No. 10-2015-0084573 filed on Jun. 15, 2015, which is hereby incorporated by reference as if fully set forth herein.

BACKGROUND

Field of the Invention

The present invention relates to a flexible display apparatus and, more particularly, to a flexible display apparatus which makes it easy to wind or unwind a flexible display module.

Description of the Related Art

In general, display apparatuses using flat display panels such as, for example, liquid crystal display apparatuses, plasma display apparatuses, organic light emitting display apparatuses, electrophoretic display apparatuses, and electro wetting display apparatuses, are mainly applied to, for example, laptop computers, portable electronic appliances, televisions, or monitors.

Conventional flat display panels use inflexible glass substrates and are limited in their applicability and fields of use. Thus, flexible display apparatuses, which are bendable through the use of flexible substrates such as, for example, plastic substrates rather than inflexible glass substrates, have recently received attention as new display apparatuses. In particular, research and development into flexible display apparatuses which enable a flexible display panel to be wound up like a roll is actively underway. For example, Korean Patent Laid Open Publication No. 10-2012-0093665 discloses a flexible display apparatus.

In the disclosed flexible display apparatus, a flexible display panel is wound around a roll by the restoration force of a spiral spring secured to a shaft inside the roll. The flexible display panel wound around the roll is drawn outward and unwound as a user pulls the flexible display panel.

However, since the flexible display panel is wound by being stacked on the outer circumferential surface of the roll, the conventional flexible display apparatus may suffer from damage to the flexible display panel or deterioration in the reliability of the flexible display panel due to repeated physical contact upon stacking of the flexible display panel. In addition, the flexible display panel is configured so as to be pulled out by the user's force and, thus, is difficult to apply to large flexible display apparatuses, in addition to portable flexible display apparatuses.

SUMMARY

Therefore, the present invention has been made in view of the above problems, and it is one object of the present invention to provide a flexible display apparatus which makes it easy to wind or unwind a flexible display module.

In addition, it is another object of the present invention to provide a flexible display apparatus which is capable of improving the reliability of a flexible display panel.

In accordance with an aspect of the present invention, to accomplish the above and other objects, a flexible display apparatus includes a frame module having a sliding path (guiding path) to guide the winding or unwinding of a flexible display module and a sliding shaft (guiding shaft) configured to slide along a spiral sliding path via the vertical movement of the flexible display module.

The flexible display apparatus according to the present invention may further include a board rotation module configured to support a control board connected to the lower side of a flexible display panel and to rotate the control board according to the sliding of the sliding shaft.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
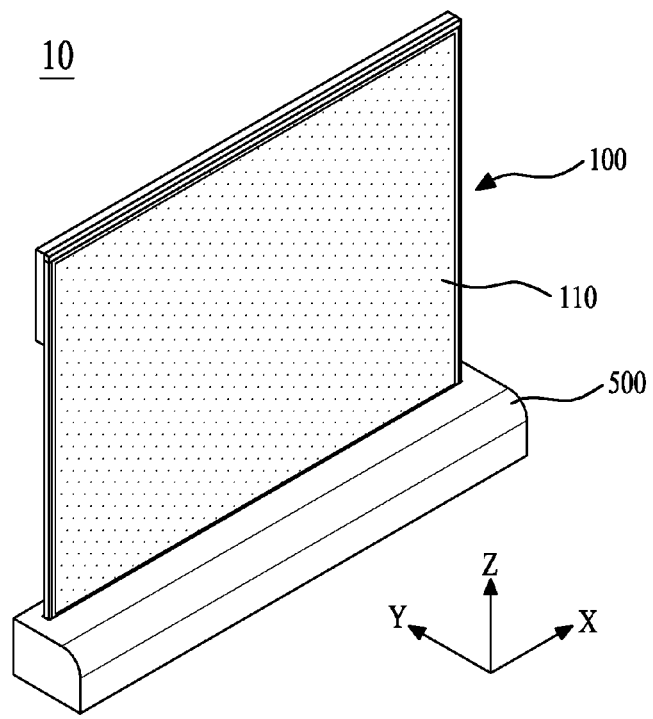
FIG. 1 is a view illustrating a flexible display module drawn outward from a housing cover in a flexible display apparatus according to one embodiment of the present invention.

The meanings of terms described in the present specification should be understood as follows.

The singular forms should be understood as including the plural forms as well unless the context clearly indicates otherwise. The terms "first", "second", and the like are used to discriminate any one element from other elements and the scope of the present invention is not intended to be limited by these terms. The terms "comprises" "includes" and the like should be understood as not precluding the presence or addition of one or more other features, integers, steps, operations, elements, components, or combinations thereof. The term "at least one" should be understood as including all combinations that may be suggested from one or more associated items. For example, the meanings of "at least one of a first item, a second item, and a third item" includes not only each of the first item, the second item, and the third item, but also all combinations of these items that may be suggested from two or more ones of the first item, the second item, and the third item. In addition, when any one element is referred to as being "on" another element, it can be directly on the upper surface of the other element or a third intervening element may also be present.

Hereinafter, exemplary embodiments of a flexible display apparatus according to the present invention will be described in detail with reference to the accompanying drawings. In the drawings, the same or similar elements are denoted by the same reference numerals even though they are depicted in different drawings. In addition, in the following description of the present invention, a detailed description of known functions and configurations incorporated herein will be omitted when it may make the subject matter of the present invention rather unclear.

Figure 2:
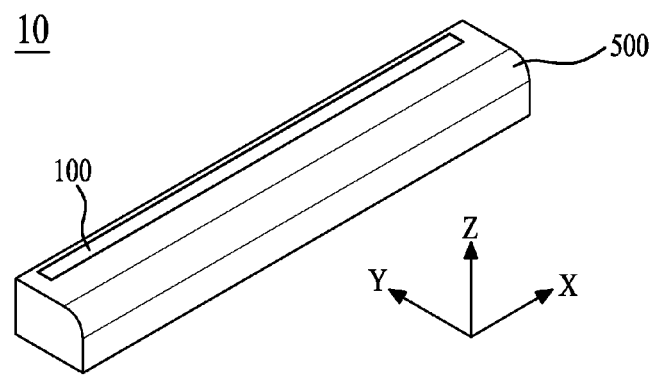
FIG. 2 is a view illustrating a flexible display module wound inside the housing cover in the flexible display apparatus according to one embodiment of the present invention.
Figure 3:
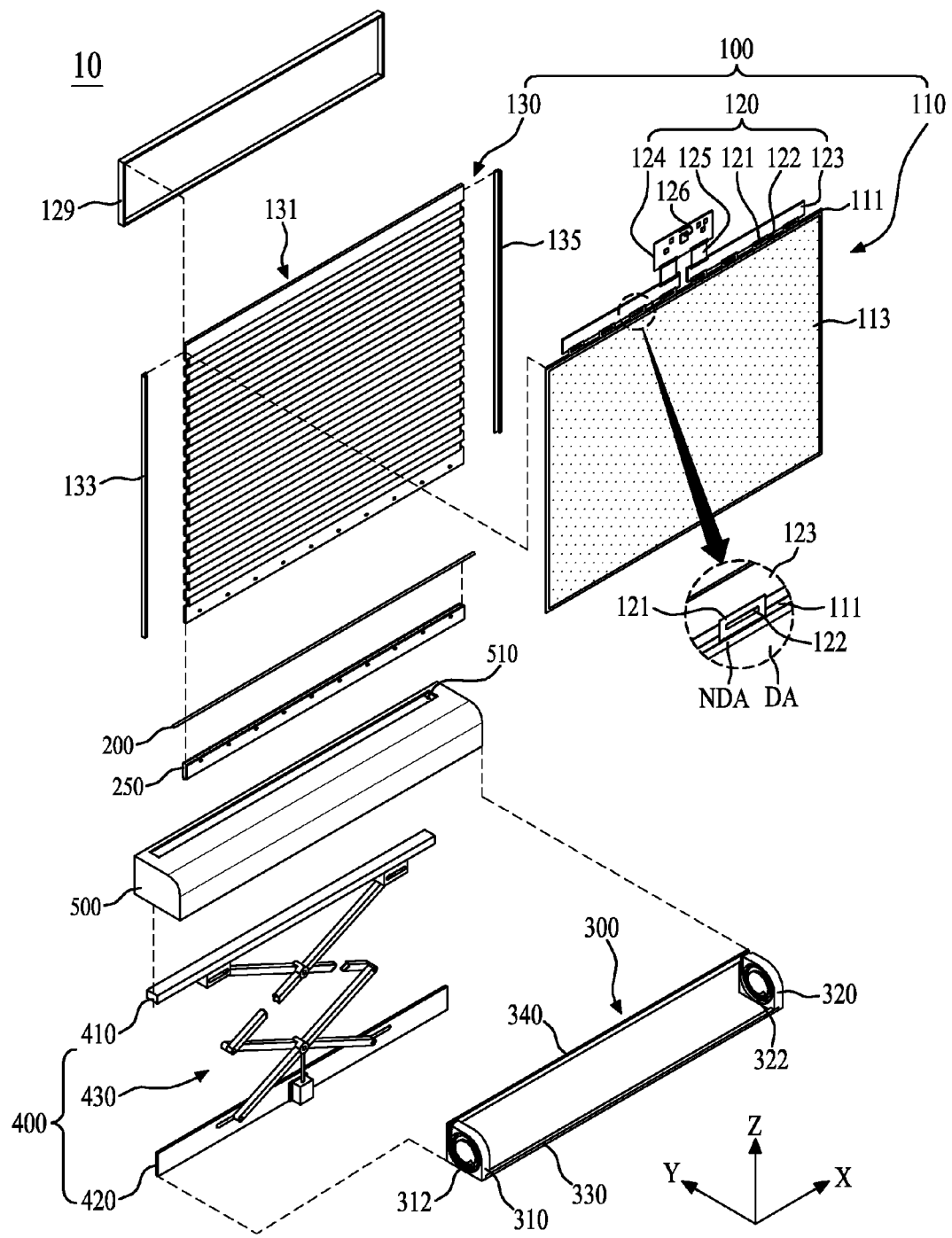
FIG. 3 is an exploded perspective view of the flexible display apparatus according to one embodiment of the present invention.

FIG. 1 is a view illustrating a flexible display module drawn outward from a housing cover in a flexible display apparatus according to one embodiment of the present invention, FIG. 2 is a view illustrating a flexible display module wound inside the housing cover in the flexible display apparatus according to one embodiment of the present invention, and FIG. 3 is an exploded perspective view of the flexible display apparatus according to one embodiment of the present invention.

Referring to FIGS. 1 to 3, the flexible display apparatus 10 according to one embodiment of the present invention includes a flexible display module 100, a sliding shaft 200, a frame module 300, a panel elevating module 400, and a cover housing 500.

The flexible display module 100 serves to display a still image, a moving image, or a stereoscopic image in the vertically upright state thereof. The flexible display module 100 may be wound in a spiral form to be received in the frame module 300 via the first direction driving of the panel elevating module 400, or may be unwound from the frame module 300 so as to stand vertically upright. The flexible display module 100 according to one embodiment may include a flexible display panel 110, a panel drive circuit unit 120, and a rear cover 130.

The flexible display panel 110 may be a flat display panel using a flexible substrate 111. For example, the flexible display panel 110 may be a flexible organic light emitting display panel, a flexible electrophoretic display panel, a flexible liquid crystal display panel, or a flexible electro wetting display panel.

The flexible display panel 110 may include the flexible substrate 111 and a cover member 113.

The flexible substrate 111 may be a plastic substrate or a flexible glass substrate. Here, the plastic substrate may be formed of any one material selected from among polyimide (PI), polyethyleneterephthalate (PET), polycarbonate (PC), polyethylene naphthalate (PEN), polynorbornene (PNB), polyethersulfone (PES), and cyclic olefin polymer (COP).

The flexible substrate 111 is a thin film transistor array substrate and includes a display area DA and a non-display area NDA surrounding the display area DA.

The display area DA includes a pixel array (not illustrated) consisting of a plurality of pixels (not illustrated) formed at all intersections of a plurality of gate lines (not illustrated) and a plurality of data lines (not illustrated). Each of the plurality of pixels includes display elements which display an image corresponding to image signals. Here, the display elements may be organic light emitting elements, liquid crystal display elements, electrophoretic elements, or electro wetting display elements, for example.

The non-display area NDA at the longer side of the flexible substrate 111 is provided with a pad portion (not illustrated) connected to the pixel array. In addition, the non-display area NDA at the shorter side of the flexible substrate 111 is provided with a gate drive circuit (not illustrated) to supply gate signals to the gate lines. The gate drive circuit may be formed simultaneously with the fabrication of thin film transistors of the respective pixels so as to be connected to the respective gate lines.

The cover member 113 is configured to cover the front surface of the remaining flexible substrate 111, except for the upper non-display area NDA of the flexible substrate 111 provided with the pad portion. Here, in the case where the display elements are organic light emitting elements or electrophoretic elements, the cover member 113 according to one embodiment may be a flexible encapsulation substrate or encapsulation layer. In the case where the display elements are liquid crystal display elements, electro wetting display elements, or electrophoretic elements, the cover member 113 according to another embodiment may be a flexible color filter substrate including color filters corresponding to the pixels.

In addition, in the case where the flexible display panel 110 is a flexible organic light emitting display panel, although the flexible display panel 110 may further include an upper polarizer film (not illustrated) attached to the upper surface of the cover member 113, the upper polarizer film may be omitted for the flexibility of the flexible display panel 110. In addition, a very thin metal plate may be attached to the rear surface of the flexible substrate 111. The metal plate may be formed of invar.

Meanwhile, the flexible display apparatus 10 according to one embodiment of the present invention may further include a touchscreen (not illustrated) for a user interface using the user's touch. The touchscreen may be attached to the flexible display panel 110, may be mounted in the flexible display panel 110 in an in-cell touch manner simultaneously with the formation of the pixel array, or may be provided at the cover member 113 via patterning.

The panel drive circuit unit 120 serves to drive the respective pixels of the pixel array provided at the flexible display panel 110 to display an image on the flexible display panel 110. The panel drive circuit unit 120 according to one embodiment may include a plurality of flexible circuit films 121, integrated data drive circuits 122, a printed circuit board 123, and a control board 124.

The respective flexible circuit films 121 are attached between the pad portion of the flexible substrate 111 and the printed circuit board 123 via a film attachment process. The flexible circuit films 121 may be Tape Carrier Packages (TCPs), Chip On Flexible Boards, or Chip On Films (COFs). The respective flexible circuit films 121 may be bent to surround the upper surface of the flexible display panel 110 and disposed on the rear surface of the rear cover 130.

The integrated data drive circuits 122 are mounted to the respective flexible circuit films 121 and connected to the pad portion using the flexible circuit films 121. The integrated data drive circuits 122 are adapted to receive pixel data on a per pixel basis and data control signals supplied from the control board 124 and to convert the pixel data on a per pixel basis into analog data signals based on the data control signals to thereby supply the data signals to the corresponding data lines through the pad portion.

The printed circuit board 123 is connected to the flexible circuit films 121. The printed circuit board 123 serves to supply drive power and signals, supplied from the control board 124, to the integrated data drive circuit 122 and the gate drive circuit, in order to display an image at the respective pixels. To this end, the printed circuit board 123 is provided with signal transmission lines and various power lines. One or more printed circuit boards 123 may be provided based on the number of the flexible circuit films 121 and disposed on the rear surface of the rear cover 130.

The control board 124 may be connected to the printed circuit board 123 using signal cables 125 and disposed on the rear surface of the rear cover 130. The control board 124 is provided with a timing controller 126, various power circuits (not illustrated), and a memory element (not illustrated), for example.

The timing controller 126 is mounted on the printed circuit board 123 to generate pixel data on a per pixel basis by aligning digital image data, input from an external host system (not illustrated) to conform to the pixel arrangement structure of the flexible display panel 110 and to supply the generated pixel data on a per pixel basis to the integrated data drive circuit 122. In addition, the timing controller 126 generates a data control signal and a gate control signal based on a timing synchronization signal supplied from the host system to control the driving timing of each of the integrated data drive circuit 122 and the gate drive circuit.

The panel drive circuit unit 120, disposed on the rear surface of the rear cover 130, may be covered with a circuit cover 129 coupled to the upper side of the rear cover 130.

The rear cover 130 is attached to the rear surface of the flexible display panel 110 and connected to the sliding shaft 200. The rear cover 130 causes the flexible display panel 110 to be wound or unwound via the sliding of the sliding shaft 200. The rear cover 130 also functions to limit the winding curvature of the flexible display panel 110 upon the winding of the flexible display panel 110 and to assist the flexible display panel 110 in standing vertically upright upon the unwinding of the flexible display panel 110.

The rear cover 130 according to a first embodiment may be attached to the rear surface of the flexible display panel 110 using a panel attachment member (not illustrated). In one embodiment, the panel attachment member may comprise a cushion material having excellent contraction and expansion. In this case, the panel attachment member prevents slippage between the rear cover 130 and the flexible display panel 110 by providing a cushioning effect upon the winding or unwinding of the flexible display panel 110.

The rear cover 130 according to the first embodiment includes a panel support unit 131, a first side protective cover 133, and a second side protective cover 135.

The panel support unit 131 is attached to the rear surface of the flexible display panel 110 using the panel attachment member so as to support the flexible display panel 110 in a bendable manner.

In one embodiment, the panel support unit 131 may include a plurality of support bars. The respective support bars are rotatably connected to one another to cover the rear surface of the flexible display panel 110. The support bars have the same length which is longer than the length of the flexible display panel 110 by a predetermined length, so as to protect the side surfaces of the flexible display panel 110 from external shock applied to the side surfaces. The respective support bars are individually rotated to correspond to the bending curvature of the flexible display panel 110 during the winding or unwinding of the flexible display panel 110, thereby guiding the flexible display panel 110 to be wound or to be unwound to stand vertically upright.

The first side protective cover 133 is configured to surround one side edge of the panel support unit 131, i.e. the front surface, the side surface and the rear surface of one side edge portion of each of the support bars, thereby absorbing external shock applied to the side surface of each support bar 131. The first side protective cover 133 may be formed of an elastic material, for example, silicon or urethane.

The second side protective cover 135 is configured to surround the other side edge of the panel support unit 131, i.e. the front surface, the side surface and the rear surface of the other side edge portion of each of the support bars, thereby absorbing external shock applied to the side surface of each support bar 131.

The sliding shaft 200 is connected to the lower side of the flexible display module 100 and also connected to the frame module 300 in a sliding manner. That is, the sliding shaft 200 is connected to a lower edge portion of the rear cover 130 using at least one module connection member 250. At this time, one side edge portion and the other side edge portion of the sliding shaft 200 are disposed in a sliding manner on the frame module 300, and a middle portion of the sliding shaft 200 except for one side edge portion and the other side edge portion is supported by the module connection member 250 which is coupled to the lower edge portion of the rear cover 130. The sliding shaft 200 is adapted to slide along a spiral sliding path formed in the frame module 300 via the vertical movement of the flexible display module 100, thereby causing the flexible display module 100 to be wound in a spiral form or to be unwound to stand vertically upright.

The module connection member 250 may have a "U"-shaped cross section and may be coupled to the lower edge portion of the rear cover 130 using fastening members such as, for example, screws while surrounding the middle portion of the sliding shaft 200 except for one side edge portion and the other side edge portion thereof. At this time, to ensure the rotation or movement of the sliding shaft 200, a prescribed gap may be provided between the module connection member 250 and the sliding shaft 200. The module connection member 250 transmits the vertical movement of the rear cover 130 to the sliding shaft 200. At this time, instantaneous shock may be generated when the rear cover 130 begins to slide. This instantaneous shock may be alleviated by the gap.

The frame module 300 is configured to guide the winding or unwinding of the flexible display module 100. That is, the frame module 300 guides the sliding of the sliding shaft 200 upon the winding or unwinding of the flexible display module 100. In one embodiment, the frame module 300 may include first and second support blocks (support members) 310 and 320.

Figure 4:
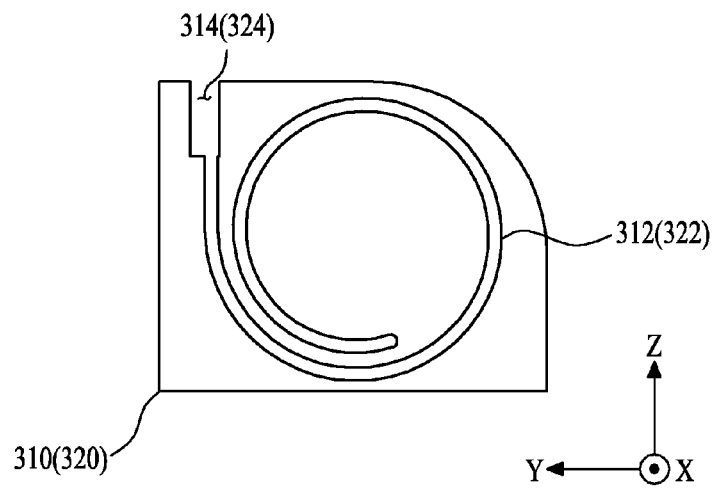
FIG. 4 is a sectional view of a support block illustrated in FIG. 3.

The first support block 310 guides the winding or unwinding of the flexible display module at one side thereof. To this end, the first support block 310, as exemplarily illustrated in FIG. 4, includes a first sliding guide member (first guide member) 312 to support one side edge portion of the sliding shaft 200 in a sliding manner.

The first sliding guide member 312 guides the sliding of the sliding shaft 200 in a spiral form, thereby preventing physical contact between the bending surfaces of the flexible display panel 110 as the flexible display panel 110 is wound via the first direction sliding of the sliding shaft 200. To this end, the first sliding guide member 312 may be a spiral slit which is coiled from a first block opening 314, exposed outward from the upper surface of the first support block 310, toward the center of the first support block 310. At this time, the first sliding guide member 312 penetrates the first support block 310 in the horizontal direction that is parallel to the longitudinal direction X of the sliding shaft 200. The first sliding guide member 312 may have a length longer than the shorter side length (i.e. the vertical length) of the flexible display module 100 and may have a thickness greater than the thickness of the flexible display module 100.

The first block opening 314 may be indented from the upper surface of the first support block 310 to have a width and a depth for receiving the circuit cover 129 coupled to the upper side of the flexible display module 100.

The second support block 320 is disposed in parallel with the first support block 310 to guide the winding or unwinding of the flexible display module 100 at the other side thereof. To this end, the second support block 320 includes a second sliding guide member (second guide member) 322 to support the other side edge portion of the sliding shaft 200 in a sliding manner.

The second sliding guide member 322 has the same shape as the first sliding guide member 312 to guide the sliding of the sliding shaft 200 in a spiral form, thereby preventing physical contact between the bending surfaces of the flexible display panel 110 as the flexible display panel 110 is wound via the first direction sliding of the sliding shaft 200. To this end, the second sliding guide member 322 may be a spiral slit which is coiled from a second block opening 324, exposed outward from the upper surface of the second support block 320, toward the center of the second support block 320. At this time, the second sliding guide member 322 penetrates the second support block 320 in the horizontal direction that is parallel to the longitudinal direction X of the sliding shaft 200. The second sliding guide member 322 may have a length longer than the shorter side length (i.e. the vertical length) of the flexible display module 100 and may have a thickness greater than the thickness of the flexible display module 100.

The second block opening 324 may be indented from the upper surface of the second support block 320 to have a width and a depth for receiving the circuit cover 129 coupled to the upper side of the flexible display module 100.

The first and second support blocks 310 and 320 may be connected at front lower corners thereof to each other using a first connection bar 330 and connected at rear upper corners thereof to each other using a second connection bar 340. As such, the first and second support blocks 310 and 320 are spaced apart from each other by a distance corresponding to the length of the sliding shaft 200. In this way, a winding space for the winding or unwinding of the flexible display module 100 is provided between the first and second support blocks 310 and 320.

Referring to FIGS. 1 to 4, the panel elevating module 400 is received inside the frame module 300 and connected to the upper side of the flexible display module 100. The panel elevating module 400 serves to vertically move the upper side of the flexible display module 100 so as to cause the winding of the flexible display module 100 or the unwinding of the wound flexible display module 100. The panel elevating module 400 according to one embodiment may include a support frame 410, a connection frame 420, and a frame elevating unit 430.

The support frame 410 is coupled to an upper edge portion of the flexible display module 100. That is, the support frame 410 is coupled to an uppermost support bar 131 of the rear cover 130.

The connection frame 420 is connected between the first and second support blocks 310 and 320 of the frame module 300 and configured to support the frame elevating unit 430. The connection frame 420 is coupled at one side edge portion thereof to the rear surface of the first support block 310 and at the other side edge portion thereof to the rear surface of the second support block 320.

The frame elevating unit 430 is installed to the connection frame 420 to vertically move the support frame 410, thereby vertically moving the flexible display module 100. The frame elevating unit 430 according to one embodiment may include a length variable member 432 and a drive member 434.

The length variable member 432 may take the form of a pantograph. In one embodiment, the length variable member 432, as exemplarily illustrated in FIGS. 3 and 5, may include a plurality of first links 432a, a plurality of second links 432b, and first to third hinge pins 432c, 432d and 432e.

The first links 432a have a constant length and are connected to one another in a zigzag form using the first hinge pins 432c so as to be rotatable relative to one another.

The second links 432b have a constant length and are connected to one another in a zigzag form using the second hinge pins 432d so as to be rotatable relative to one another.

Each of the first hinge pins 432c between the neighboring first links 432a rotatably supports the first links 432a. At this time, one first hinge pin 432c1, which is connected to the lower end of a lowermost first link among the first links 432a, is movably inserted into a first lower guide hole 422a formed in the connection frame 420. In addition, another first hinge pin 432c2, which is connected to the upper end of an uppermost first link among the first links 432a, is movably inserted into a first upper guide hole 412a formed in the support frame 410.

Each of the second hinge pins 432d between the neighboring second links 432b rotatably supports the second links 432b. At this time, one second hinge pin 432d1, which is connected to the lower end of a lowermost second link among the second links 432b, is movably inserted into a second lower guide hole 422b formed in the connection frame 420. In addition, another second hinge pin 432d2, which is connected to the upper end of an uppermost second link among the second links 432b, is movably inserted into a second upper guide hole 412b formed in the support frame 410.

Each of the third hinge pins 432e rotatably supports the intersections of the first and second links 432a and 432b which intersect each other in an X-shaped form.

One first link 432a and one second link 432b, which intersect each other in an X-shaped form so as to be rotatable relative to each other about the third hinge pin 432e, constitute one link group, and respective link groups are rotatably connected to each other using the first and second hinge pins 432c and 432d.

In this way, the length variable member 432 may be expanded or contracted as the respective first and second links 432a and 432b rotate about the first to the third hinge pins 432c, 432d and 432e, thereby easily vertically moving the support frame 410.

The drive member 434 is adapted to vary the length of the length variable member 432 to vertically move the support frame 410, thereby vertically moving the flexible display module 100. That is, the drive member 434 vertically moves the lowermost third hinge pin 432e1 among the third hinge pins 432e to fold or unfold the respective first and second links 432a and 432b, thereby increasing or reducing the length of the length variable member 432. For example, upon the winding of the flexible display module 100, the drive member 434, as exemplarily illustrated in FIG. 6, downwardly moves the lowermost third hinge pin 432e1 to fold the respective first and second links 432a and 432b, thereby downwardly moving the support frame 410 and, consequently, winding the flexible display module 100 in a spiral form inside the frame module 300. In contrast, upon the unwinding of the flexible display module 100, the drive member 434, as exemplarily illustrated in FIG. 5, upwardly moves the lowermost third hinge pin 432e1 to unfold the respective first and second links 432a and 432b, thereby upwardly moving the support frame 410 and, consequently, unwinding the flexible display module 100, which has been wound in a spiral form inside the frame module 300, so as to stand vertically upright.

In one embodiment, the drive member 434 may be an air cylinder or a pneumatic cylinder having an elevating shaft connected to the lowermost third hinge pin 432e1, or may be a linear motor.

Referring again to FIGS. 1 to 3, the cover housing 500 is an outermost case covering the frame module 300 and includes a panel elevating slot 510 for the introduction and removal of the flexible display module 100. The cover housing 500 hides the sliding shaft 200, the frame module 300, and the panel elevating module 400.

Figure 7A:
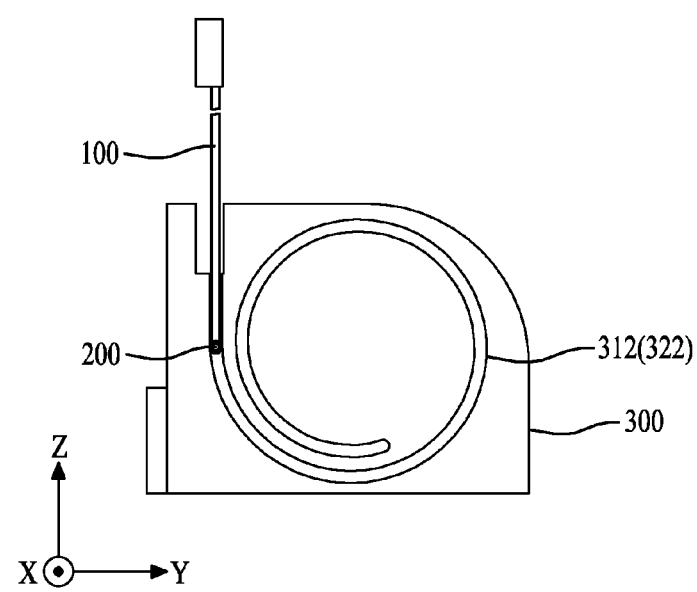
FIGS. 7A to 7C are views explaining the process of winding the flexible display apparatus according to one embodiment of the present invention.
Figure 7B:
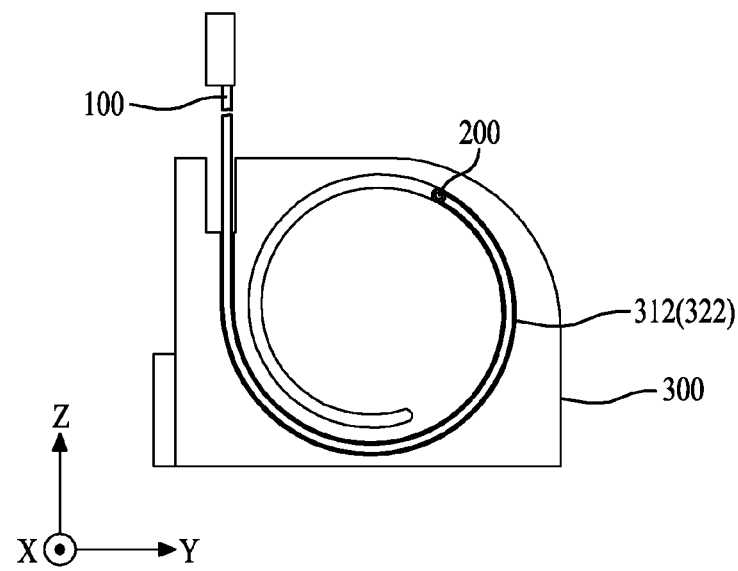
Figure 7C:
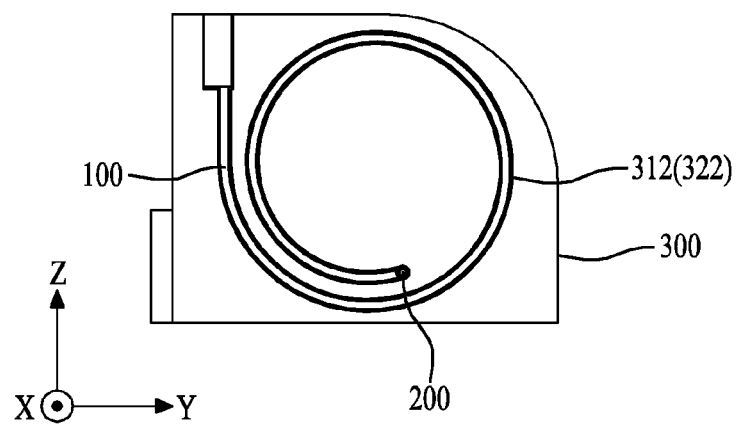

FIGS. 7A to 7C are views explaining the process of winding the flexible display apparatus according to one embodiment of the present invention.

The process of winding the flexible display apparatus 10 according to one embodiment of the present invention will be described below with reference to FIGS. 7A to 7C in connection with FIG. 3.

First, the flexible display module 100, as exemplarily illustrated in FIG. 7A, displays an image on the flexible display panel 110 in the state in which it is drawn outward through the panel elevating slot 510 of the cover housing 500 so as to stand vertically upright via the unwinding driving of the panel elevating module 400.

Subsequently, as exemplarily illustrated in FIG. 7B, when the flexible display module 100 is downwardly moved via the winding driving of the panel elevating module 400, the sliding shaft 200 slides along the spiral sliding paths 312 and 322 formed in the frame module 300 in connection with the downward movement of the flexible display module 100. Thereby, the flexible display module 100 is wound into the frame module 300 along the spiral sliding paths 312 and 322. At this time, the bending surfaces of the flexible display module 100 are wound to overlap each other without physical contact owing to the spiral sliding paths 312 and 322.

Subsequently, as exemplarily illustrated in FIGS. 2 and 7C, when the sliding shaft 200 slides to a winding end position as the flexible display module 100 is downwardly moved via the winding driving of the panel elevating module 400, the upper end of the flexible display module 100 is inserted into the panel elevating slot 510 of the housing cover 500. Thereby, the flexible display module 100 is wound in a spiral form inside the frame module 300 so as not to be exposed outward from the housing cover 500.

Meanwhile, the process of unwinding the flexible display apparatus 10 according to one embodiment of the present invention is a process in which the flexible display module 100 is outwardly drawn from the housing cover 500 to stand vertically upright via the unwinding driving of the panel elevating module 400 and is the opposite of the process of winding the flexible display apparatus 10 as described above and, thus, a description thereof will be omitted below.

In this way, the flexible display apparatus 10 according to one embodiment of the present invention may make it easy to wind or unwind the large flexible display module 100 via the driving of the panel elevating module 400 and may prevent physical contact between the bending surfaces of the flexible display panel 110 by spirally winding or unwinding the flexible display module 100 along the spiral sliding paths, which may result in the improved reliability of the flexible display panel 110.

Figure 8:
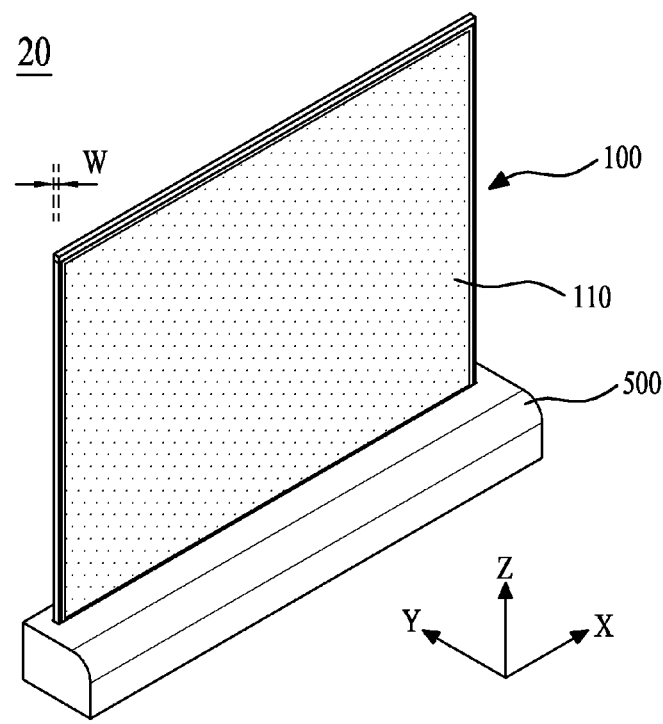
FIG. 8 is a view illustrating the flexible display module drawn outward from the housing cover in the flexible display apparatus according to another embodiment of the present invention.
Figure 9:
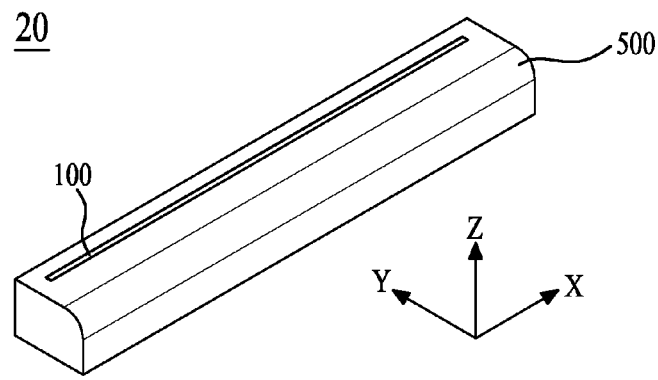
FIG. 9 is a view illustrating the flexible display module wound inside the housing cover in the flexible display apparatus according to another embodiment of the present invention.
Figure 10:
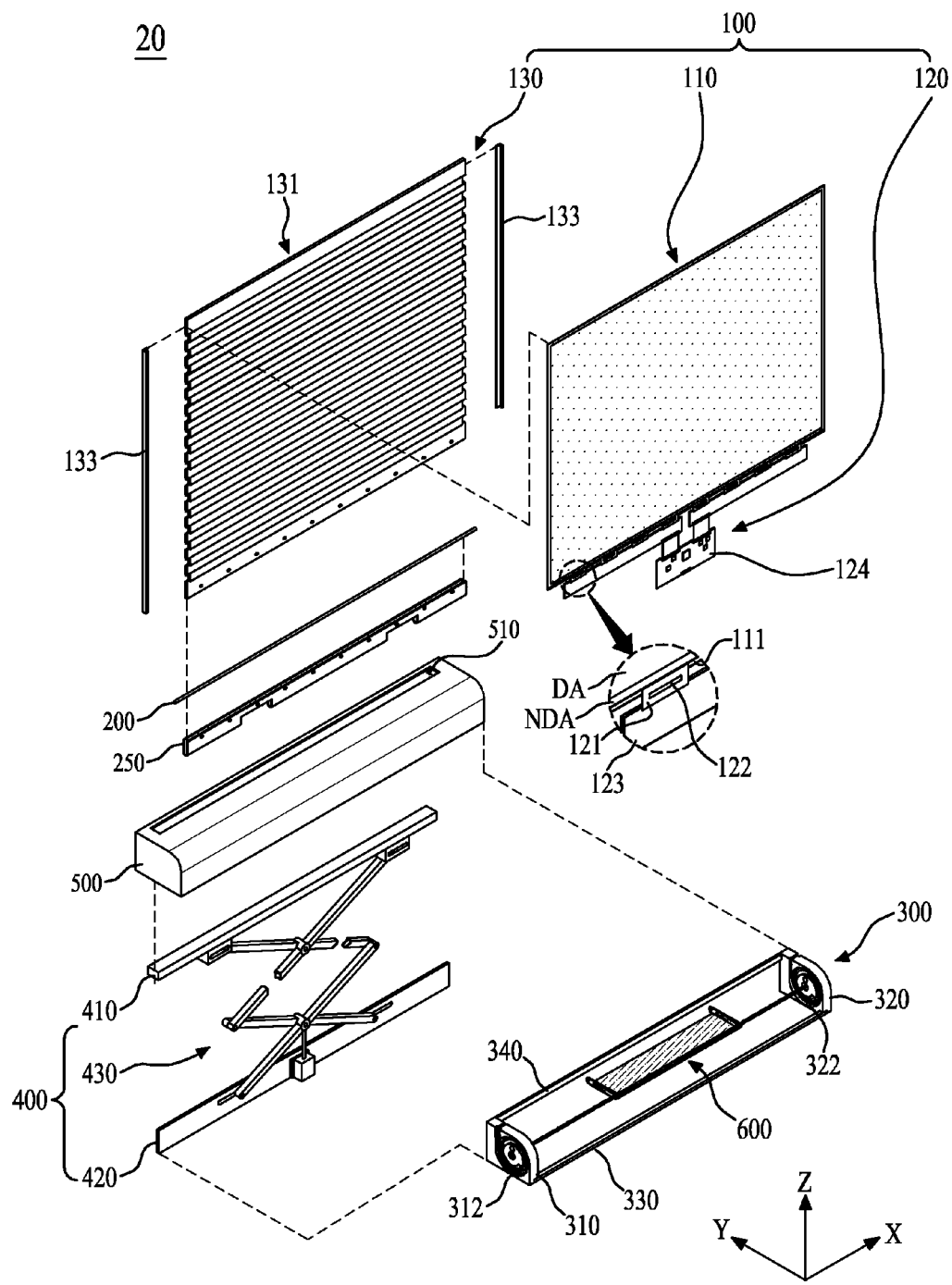
FIG. 10 is an exploded perspective view of the flexible display apparatus according to another embodiment of the present invention.
Figure 11:
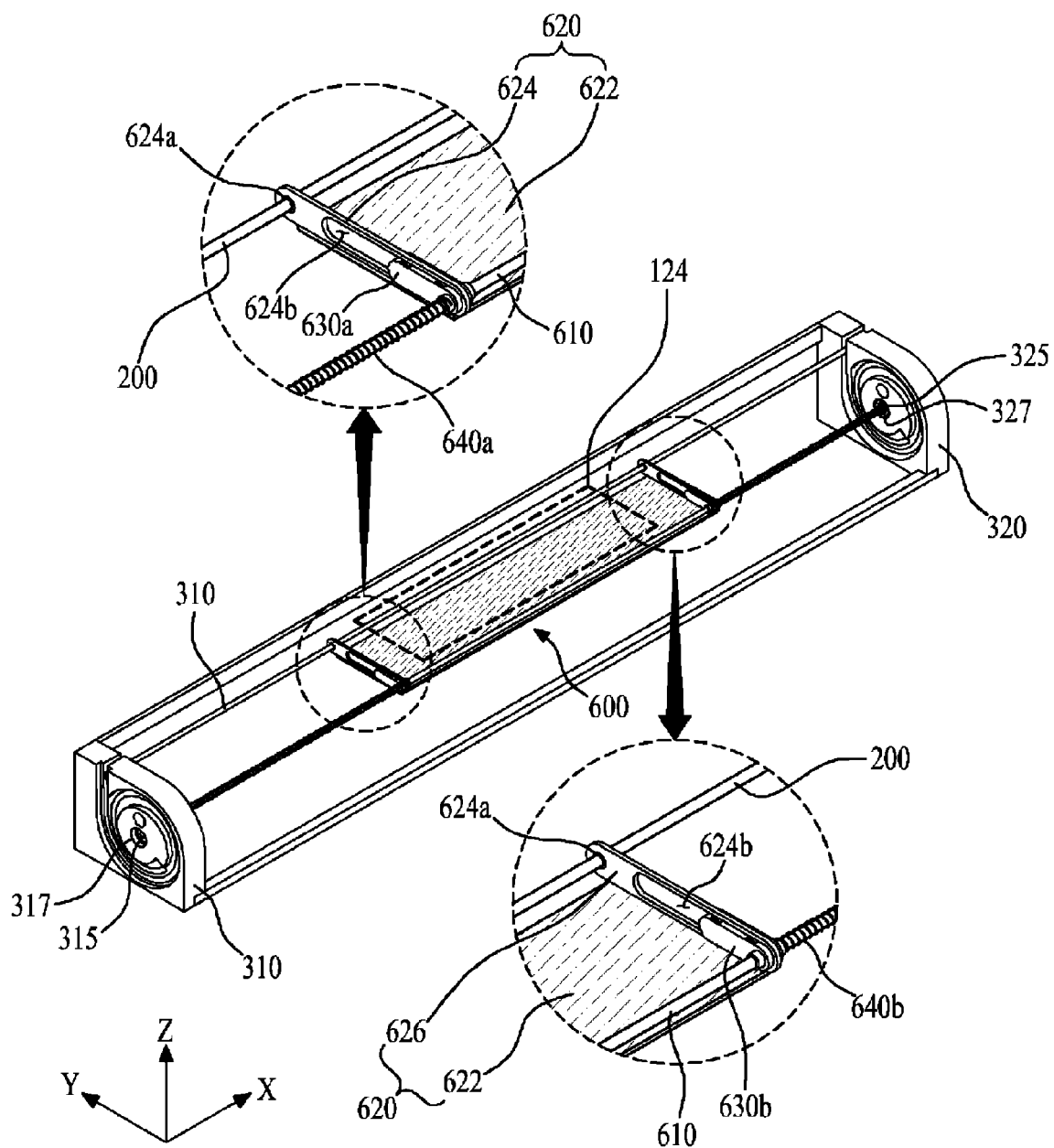
FIG. 11 is a view explaining a board rotation module illustrated in FIG. 10.

FIG. 8 is a view illustrating the flexible display module drawn outward from the housing cover in the flexible display apparatus according to another embodiment of the present invention, FIG. 9 is a view illustrating the flexible display module wound inside the housing cover in the flexible display apparatus according to another embodiment of the present invention, FIG. 10 is an exploded perspective view of the flexible display apparatus according to another embodiment of the present invention, and FIG. 11 is a view explaining a board rotation module illustrated in FIG. 10.

Referring to FIGS. 8 to 11, the flexible display apparatus 20 according to another embodiment of the present invention includes the flexible display module 100, the sliding shaft 200, the frame module 300, the panel elevating module 400, the cover housing 500, and a board rotation module 600. The flexible display apparatus 20 having the above-described configuration according to another embodiment of the present invention is changed in the arrangement structure of the flexible display module, compared to the flexible display apparatus according to one embodiment of the present invention as described above, in order to reduce the thickness W of the flexible display module 100 that is configured to be drawn outward and further includes the board rotation module 600. Thus, the following description will focus on only different configurations.

First, the flexible display module 100 includes the flexible display panel 110, the panel drive circuit unit 120, and the rear cover 130. This configuration of the flexible display module 100 is identical to the above description except that the panel drive circuit unit 120 is connected to the lower side of the flexible display panel 110 and, thus, a description thereof will be omitted below. That is, in order to reduce the thickness W of the flexible display module 100 that is configured to be drawn outward, the flexible display module 100 is reversed up and down compared to that of FIG. 3. As such, the panel drive circuit unit 120 connected to the flexible display panel 110 is received inside the frame module 300 so as not to be exposed outward. Accordingly, the flexible display apparatus 20 according to another embodiment of the present invention enables omission of the circuit cover 129, compared to the flexible display apparatus 10 illustrated in FIG. 3. Thereby, the flexible display module 100, which has been drawn outward to stand vertically upright, has a flat rear surface, which may result in a reduction in the thickness W of the drawn flexible display module 100.

The board rotation module 600 serves to support the control board 124 of the panel drive circuit unit 120 as described above and to rotate the control board 124 via the sliding of the sliding shaft 200, thereby allowing the flexible display panel 110 to be wound in a spiral form even if the panel drive circuit unit 120 is connected to the lower side of the flexible display panel 110. At this time, the control board 124 is located inside the spirally wound flexible display panel 110. In one embodiment, the board rotation module 600 may include a rotating shaft 610 and a board bracket 620.

The rotating shaft 610 is rotatably installed between the centers of the first and second support blocks 310 and 320 of the above-described frame module 300. At this time, a first shaft hole 315 is formed in the center of the first support block 310 and a first bearing 317 is interposed between one end of the rotating shaft 610 and the first shaft hole 315. In addition, a second shaft hole 325 is formed in the center of the second support block 320 and a second bearing 327 is interposed between the other end of the rotating shaft 610 and the second shaft hole 325. The rotating shaft 610 is rotated in connection with rotation of the board bracket 620 caused by the sliding of the sliding shaft 200.

The board bracket 620 is installed between the sliding shaft 200 and the rotating shaft 610 to support the control board 124 and is rotated about the rotating shaft 610 via the spiral sliding of the sliding shaft 200. In one embodiment, the board bracket 620 may include a bottom portion 622 and first and second sidewall portions 624 and 626.

The bottom portion 622 takes the form of a flat plate to support the control board 124. At this time, the control board 124 may be coupled to the bottom portion 622 via fastening members such as, for example, screws.

The first and second sidewall portions 624 and 626 are installed in parallel with each other at both side edge portions of the bottom portion 622 to extend between the sliding shaft 200 and the rotating shaft 610.

One side of each of the first and second sidewall portions 624 and 626 is supported by the sliding shaft 200. More specifically, one side of each of the first and second sidewall portions 624 and 626 is rotatably connected to the sliding shaft 200. To this end, a shaft through-hole 624a for the penetration of the sliding shaft 200 is formed in one side of each of the first and second sidewall portions 624 and 626. A third bearing (not illustrated) may be interposed between one side of each of the first and second sidewall portions 624 and 626 and the sliding shaft 200.

The other side of each of the first and second sidewall portions 624 and 626 is supported by the rotating shaft 610. More specifically, the other side of each of the first and second sidewall portions 624 and 626 is rotatably and movably connected to the rotating shaft 610. To this end, a rectangular slot 624b for the penetration of the rotating shaft 610 is formed in the other side of each of the first and second sidewall portions 624 and 626. Here, since the sliding shaft 200 slides along a spiral sliding path, the sliding curvature of the sliding shaft 200 relative to the rotating shaft 610 varies according to the sliding position of the sliding shaft 200. For example, a distance between the sliding shaft 200 and the rotating shaft 610 is reduced as the sliding shaft 200 slides inward from the outer side of the spiral sliding path. As such, the rectangular slot 624b is formed to have a length corresponding to the maximum variation in the distance between the sliding shaft 200 and the rotating shaft 610 caused by variation in the sliding curvature of the sliding shaft 200, thereby allowing the first and second sidewall portions 624 and 626, i.e. the board bracket 620 to be moved by the push force of the sliding shaft 200 that corresponds to variation in the sliding curvature of the sliding shaft 200. Accordingly, the board bracket 620 configured to support the control board 124 is rotated about the rotating shaft 610 in connection with the sliding of the sliding shaft 200, thereby being moved, along with the sliding shaft 200, toward the rotating shaft 610 by the push force of the sliding shaft 200 that corresponds to variation in the distance between the sliding shaft 200 and the rotating shaft 610 based on variation in the sliding curvature of the sliding shaft 200. As a result, the relative rotation and movement of the board bracket 620 connected to the rotating shaft 610 enables the sliding shaft 200 to smoothly slide along the spiral sliding paths 312 and 322.

In addition, the board rotation module 600 may further include first and second bracket movement guides 630a and 630b to guide the board bracket 620 so as to be smoothly moved by the push force of the sliding shaft 200 as the sliding shaft 200 slides along the spiral sliding paths 312 and 322.

The first bracket movement guide 630a is installed between the rotating shaft 610 and the rectangular slot 624b formed in the first sidewall portion 624. In one embodiment, the first bracket movement guide 630a may be a bearing holder coupled to the rotating shaft 610 so as to be inserted into the rectangular slot 624b formed in the first sidewall portion 624.

The second bracket movement guide 630b is installed between the rotating shaft 610 and the rectangular slot 624b formed in the second sidewall portion 626. In one embodiment, the second bracket movement guide 630b may be a bearing holder coupled to the rotating shaft 610 so as to be inserted into the rectangular slot 624b formed in the second sidewall portion 626.

In addition, the board rotation module 600 may further include first and second torsion springs 640a and 640b to rotate the rotating shaft 610 using elastic restoration force.

The first torsion spring 640a is installed between one end of the rotating shaft 610 and the first bracket movement guide 630a so as to surround one side portion of the rotating shaft 610. One end of the first torsion spring 640a is coupled to one end of the rotating shaft 610 and the other end of the torsion spring 640a is coupled to the first bracket movement guide 630a. The first torsion spring 640a is compressed via the second direction sliding of the sliding shaft 200 (the unwinding operation of the flexible display module 100) opposite to the first direction sliding (the winding operation of the flexible display module 100) and rotates the rotating shaft 610 using elastic restoration force upon the first direction sliding of the sliding shaft 200. In addition, the first torsion spring 640a also serves to cause the winding of the flexible display module 100 using elastic restoration force. Here, although the first torsion spring 640a may rotate the rotating shaft 610 using elastic restoration force upon the second direction sliding of the sliding shaft 200, the panel drive circuit unit 120, i.e. the flexible circuit films 121 may be wrinkled and damaged in the case where the downward movement of the flexible display module 100 and the sliding of the sliding shaft 200 are not synchronized upon the winding of the flexible display module 100. Therefore, to prevent this problem, the first torsion spring 640a may rotate the rotating shaft 610 using elastic restoration force upon the first direction sliding of the sliding shaft 200.

The second torsion spring 640b is installed between the other end of the rotating shaft 610 and the second bracket movement guide 630b so as to surround the other side portion of the rotating shaft 610. One end of the second torsion spring 640b is coupled to one end of the rotating shaft 610 and the other end of the second torsion spring 640b is coupled to the second bracket movement guide 630b. The second torsion spring 640b is compressed via the second direction sliding of the sliding shaft 200 and rotates the rotating shaft 610 using elastic restoration force during the first direction sliding of the sliding shaft 200. In addition, the second torsion spring 640b serves to cause the winding of the flexible display module 100 using elastic restoration force.

Although the board rotation module 600 may include any one of the first and second torsion springs 640a and 640b, in order to provide the rotating shaft 610 with even elastic restoration force, the board rotation module 600 may include all of the first and second torsion springs 640a and 640b.

In addition, the board rotation module 600 may include a rotation motor (not illustrated) coupled to one side surface of the rotating shaft 610, rather than the first and second torsion springs 640a and 640b. The rotation motor may be synchronized with the driving of the panel elevating module 400 to rotate the rotating shaft 610 in the direction corresponding to the first direction sliding and/or the second direction sliding of the sliding shaft 200.

Figure 12A:
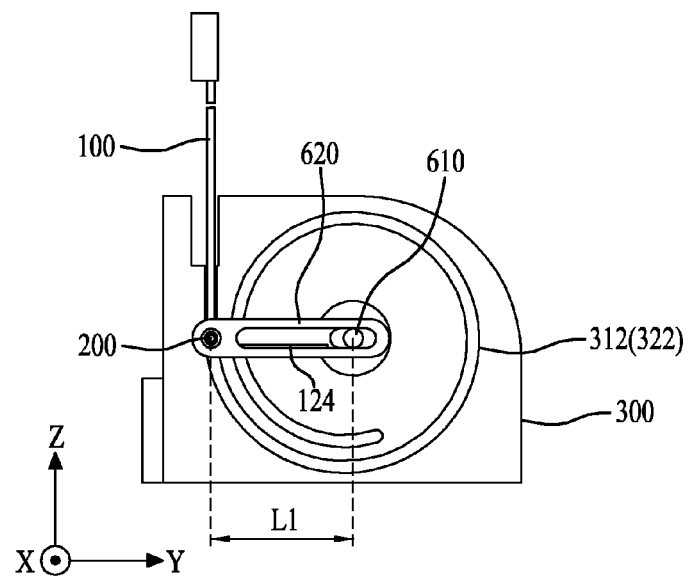
FIGS. 12A to 12C are views explaining the process of winding the flexible display apparatus according to another embodiment of the present invention.
Figure 12B:
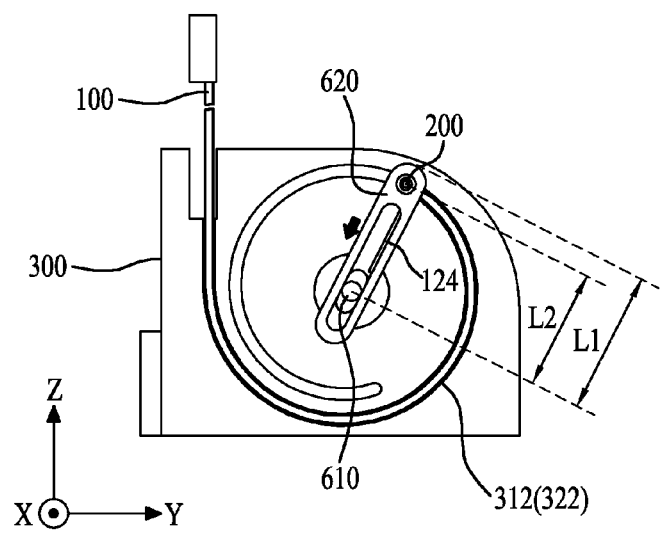
Figure 12C:
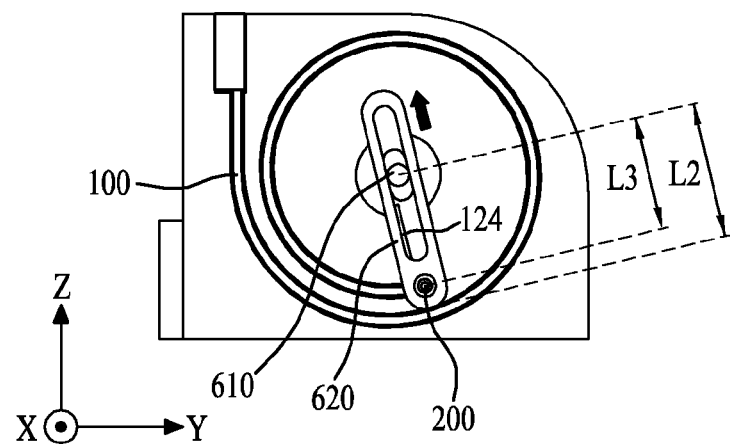

FIGS. 12A to 12C are views explaining the process of winding the flexible display apparatus according to another embodiment of the present invention.

The process of winding the flexible display apparatus 20 according to another embodiment of the present invention will be described below with reference to FIGS. 12A to 12C in connection with FIG. 10.

First, the flexible display module 100, as exemplarily illustrated in FIG. 12A, displays an image on the flexible display panel 110 in the state in which it is drawn outward through the panel elevating slot 510 of the cover housing 500 so as to stand vertically upright via the unwinding driving of the panel elevating module 400.

Subsequently, as exemplarily illustrated in FIG. 12B, when the flexible display module 100 is downwardly moved via the winding driving of the panel elevating module 400, the sliding shaft 200 slides along the spiral sliding paths 312 and 322 formed in the frame module 300 in connection with the downward movement of the flexible display module 100. Thereby, the flexible display module 100 is wound into the frame module 300 along the spiral sliding paths 312 and 322. At this time, the bending surfaces of the flexible display module 100 are wound to overlap each other without physical contact owing to the spiral sliding paths 312 and 322. Simultaneously, as the board bracket 620 of the board rotation module 600 to support the control board 124 is rotated about the rotating shaft 610 in connection with the sliding of the sliding shaft 200, the board bracket 620 is moved, along with the sliding shaft 200, toward the rotating shaft 610 by the push force of the sliding shaft 200 that corresponds to variation (L1-L2) in the distance between the rotating shaft 610 and the sliding shaft 200 based on variation in the sliding curvature of the sliding shaft 200. Accordingly, upon the winding driving of the panel elevating module 400, the control board 124, which is connected to the flexible display module 100 and supported by the board bracket 620, is rotated inside the flexible display module 100 as the flexible display module 100 is wound in a spiral form via the rotation of the board bracket 620. In this way, according to the present invention, the panel drive circuit unit 120 may be connected to the lower side of the flexible display module 100, which may result in a reduction in the thickness W of the drawn flexible display module 100.

In addition, when the flexible display module 100 is downwardly moved via the winding driving of the panel elevating module 400, the rotating shaft 610 may be rotated using elastic restoration force of the first and second torsion springs 640a and 640b.

Subsequently, as exemplarily illustrated in FIGS. 9 and 12C, when the sliding shaft 200 slides to a winding end position as the flexible display module 100 is downwardly moved via the winding driving of the panel elevating module 400, the upper end of the flexible display module 100 is inserted into the panel elevating slot 510 of the housing cover 500. Thereby, the flexible display module 100 is wound in a spiral form inside the frame module 300 so as not to be exposed outward from the housing cover 500. Simultaneously, as the board bracket 620 is rotated about the rotating shaft 610 via the sliding of the sliding shaft 200, the control board 124 is stably located inside the spirally wound flexible display panel 110. At this time, the board bracket 620 is moved, along with the sliding shaft 200, toward the rotating shaft 610 by the push force of the sliding shaft 200 that corresponds to variation (L2-L3) in the distance between the sliding shaft 200 and the rotating shaft 610 based on variation in the sliding curvature of the sliding shaft 200 and, owing to the rotation and movement of the board bracket 620, the sliding shaft 200 slides in a spiral form to a winding end position along the spiral sliding paths 312 and 322 while being moved toward the rotating shaft 610.

In this way, the flexible display apparatus 20 according to another embodiment of the present invention may provide the same effects as the flexible display apparatus 10 according to one embodiment of the present invention and the panel drive circuit unit 120 is rotatably received inside the frame module 200 so as not to be exposed outward, which may result in a reduction in the thickness W of the drawn flexible display module 100.

Figure 13A:
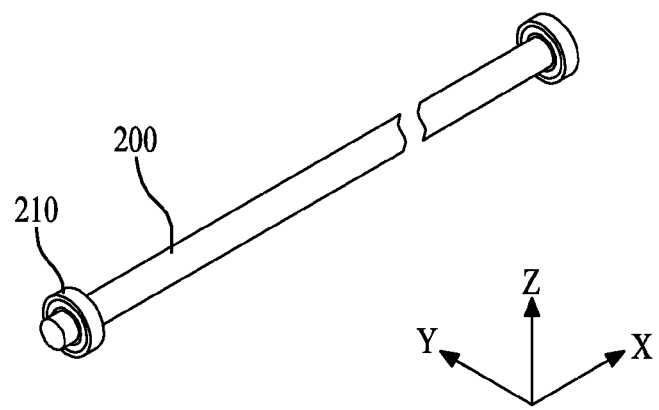
FIGS. 13A and 13B are views explaining a first embodiment of sliding induction units in the flexible display apparatus according to the present invention.
Figure 13B:
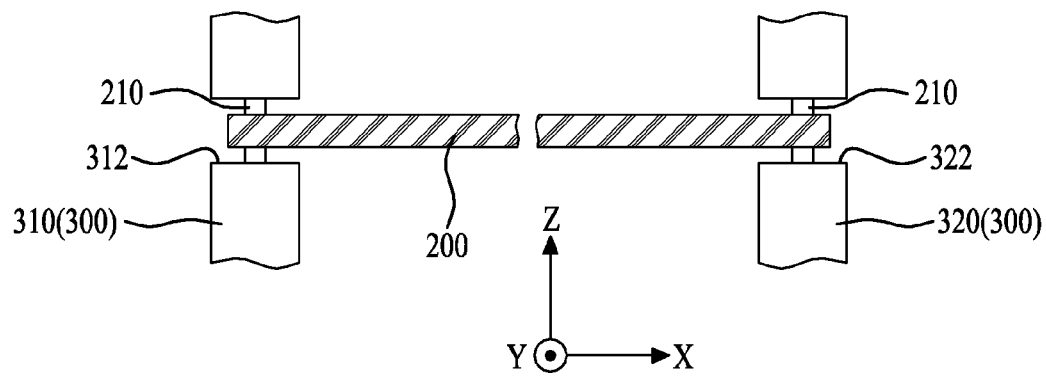

FIGS. 13A and 13B are views explaining a first embodiment of sliding induction units (guiding induction units) in the flexible display apparatus according to the present invention.

Referring to FIGS. 13A and 13B, the sliding induction units 210 according to the first embodiment may be installed respectively to both ends of the sliding shaft 200 and inserted respectively into the first and second sliding guide members 312 and 322 provided at the frame module 300. That is, the sliding induction units 210 according to the first embodiment are interposed between the sliding shaft 200 and the respective first and second sliding guide members 312 and 322 provided at the respective support blocks 310 and 320 of the frame module 300. The sliding induction units 210 according to the first embodiment may be bearing members, for example, rolling bearings. The sliding induction units 210 according to the first embodiment serve to guide the sliding of the sliding shaft 200 while reducing friction between the sliding shaft 200 and the support blocks 310 and 320.

Figure 14A:
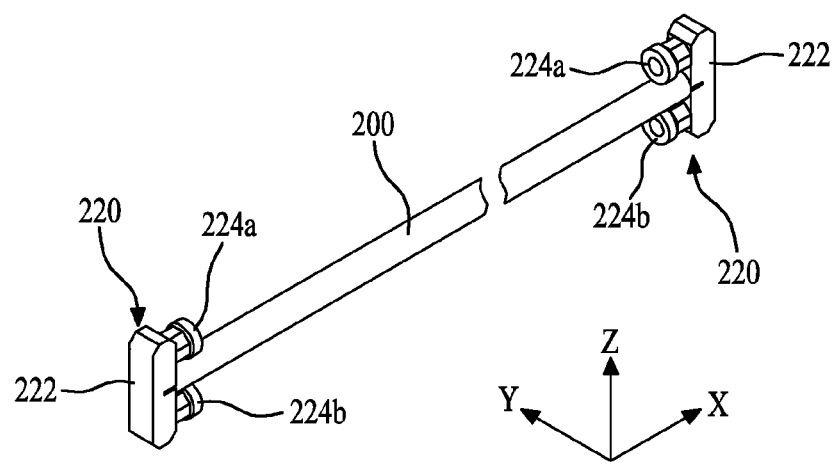
FIGS. 14A and 14B are views explaining a second embodiment of sliding induction units in the flexible display apparatus according to the present invention.
Figure 14B:
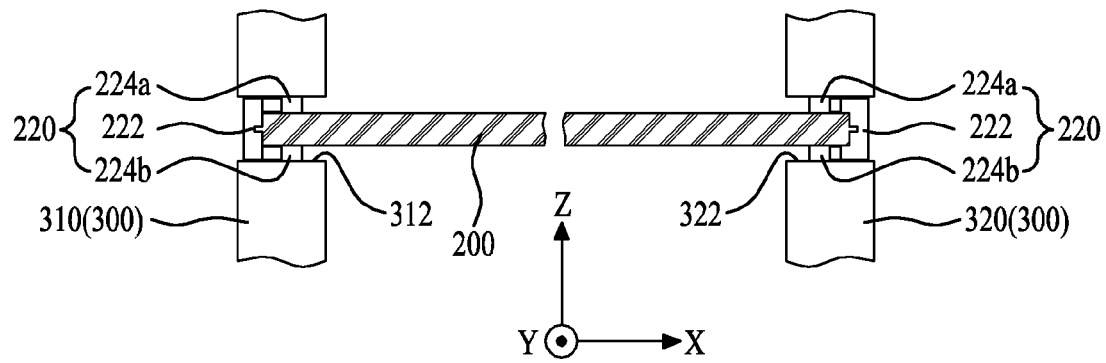

FIGS. 14A and 14B are views explaining a second embodiment of sliding induction units in the flexible display apparatus according to the present invention.

Referring to FIGS. 14A and 14B, the sliding induction units 220 according to the second embodiment may be installed respectively to both ends of the sliding shaft 200 and inserted respectively into the first and second sliding guide members 312 and 322 provided at the frame module 300. That is, the sliding induction units 220 according to the second embodiment are interposed between the sliding shaft 200 and the respective first and second sliding guide members 312 and 322 provided at the respective support blocks 310 and 320 of the frame module 300. For example, each of the sliding induction units 220 according to the second embodiment may include a support holder 222 coupled to a corresponding one of both ends of the sliding shaft 200 and a pair of bearing members 224a and 224b which are installed to the inner side surface of the support holder 222 so as to be parallel to each other with the sliding shaft 200 interposed therebetween, the bearing members 224a and 224b being inserted respectively into the first and second sliding guide members 312 and 322.

Each of the bearing members 224a and 224b is interposed between the outer circumferential surface of the sliding shaft 200 and the inner surface of a corresponding one of the sliding guide members 312 and 322 to guide the sliding of the sliding shaft 200 while reducing friction between the sliding shaft 200 and the support blocks 310 and 320. The bearing members 224a and 224b may be rolling bearings.

Figure 15A:
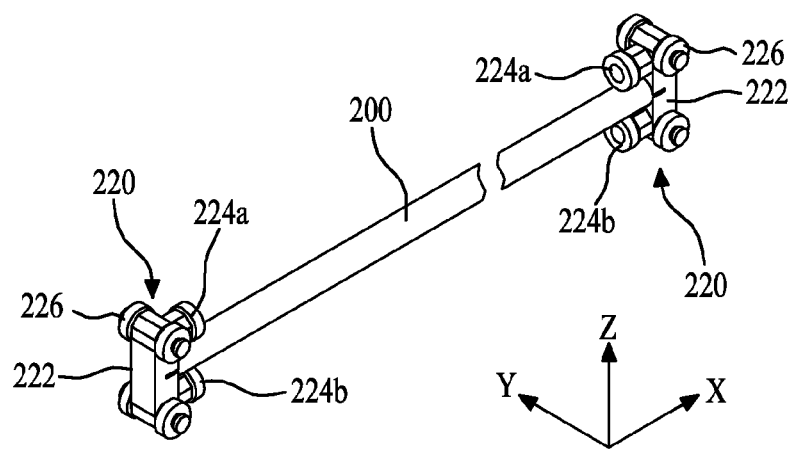
FIGS. 15A and 15B are views explaining a follower bearing member of the sliding induction unit of the second embodiment in the flexible display apparatus according to the present invention.
Figure 15B:
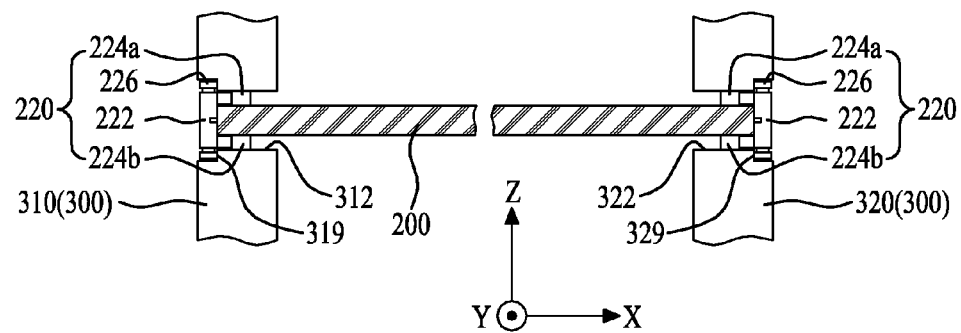

In addition, each sliding induction unit 220 according to the second embodiment, as exemplarily illustrated in FIGS. 15A and 15B, may further include a plurality of follower bearing members 226.

The follower bearing members 226 are installed to both side surfaces of the support holder 222 to have a second rotation axis intersecting with a first rotation axis of the bearing members 224a and 224b. The follower bearing members 226 serve to prevent the longitudinal distortion of the sliding shaft 200 by being rotated in contact with the outer surface of a corresponding one of the support blocks 310 and 320 during the sliding of the sliding shaft 200. The follower bearing members 226 may be rolling bearings.

The first and second support blocks 310 and 320 may further include guide grooves 319 and 329 respectively.

The guide grooves 319 and 329 are indented from the outer surfaces of the respective first and second support blocks 310 and 320 to have a constant depth along the spiral sliding paths 312 and 322. The follower bearing members 226 are inserted respectively into the guide grooves 319 and 329 so as not to protrude from the outer surfaces of the support blocks 310 and 320. The guide grooves 319 and 329 serve to guide the movement of the follower bearing members 226 via the sliding of the sliding shaft 200, thereby enabling the sliding shaft 200 to stably slide without longitudinal distortion.

Figure 16:
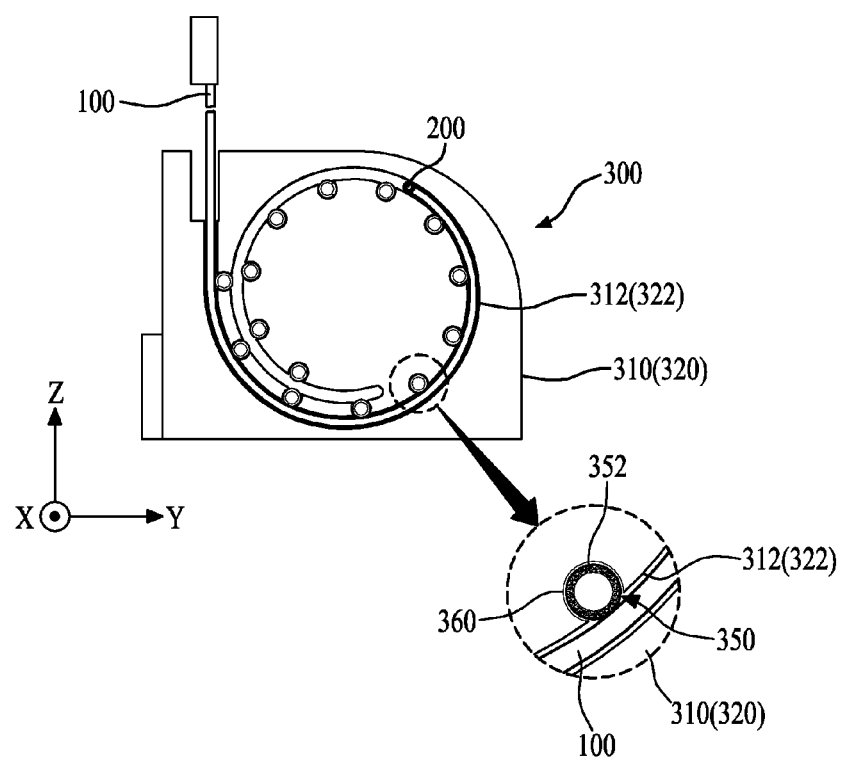
FIG. 16 is a view explaining one embodiment of a panel sliding guide in the flexible display apparatus according to the present invention.

FIG. 16 is a view explaining one embodiment of a panel sliding guide (panel guide) in the flexible display apparatus according to the present invention.

Referring to FIG. 16, the panel sliding guide 350 according to one embodiment is disposed in the spiral sliding path formed in the frame module 300 to guide the sliding of the flexible display module 100 along the spiral sliding path.

The panel sliding guide 350 according to one embodiment may include a plurality of rollers 352 installed in the sliding guide members 312 and 322 so as to be spaced apart from one another by a constant distance for physical contact with the flexible display module 100.

The respective rollers 352 are installed to the inner surface of each support block 310 and 320 to protrude toward the spiral sliding path so as to physically come into contact with the flexible display module 100. To this end, a plurality of recesses 360 is formed in the inner surface of each support block 310 and 320 such that the rollers 352 are rotatably inserted into the recesses 360 respectively. One side of each recess 360 is in communication with the spiral sliding path to allow the circumferential surface of the corresponding roller 352 to protrude toward the spiral sliding path. As such, the respective rollers 352 are rotatably installed in the recesses 360 and rotated by coming into contact with the flexible display module 100 as the flexible display module 100 slides along the spiral sliding path, thereby minimizing friction between the flexible display module 100 and the sliding guide members 312 and 322 as well as the generation of noise caused by the sliding of the flexible display module 100 while guiding the sliding of the flexible display module 100.

The respective rollers 352 may be formed of a soft material in order to prevent damage to the flexible display module 100 that physically comes into contact with the rollers 352.

In another embodiment, the panel sliding guide 350 may include a plurality of rolling bearings, rather than the rollers.

Meanwhile, although the panel sliding guide 350 according to one embodiment guides the sliding of the flexible display module 100 via physical contact with the flexible display module 100, the present invention is not limited thereto.

Figure 17:
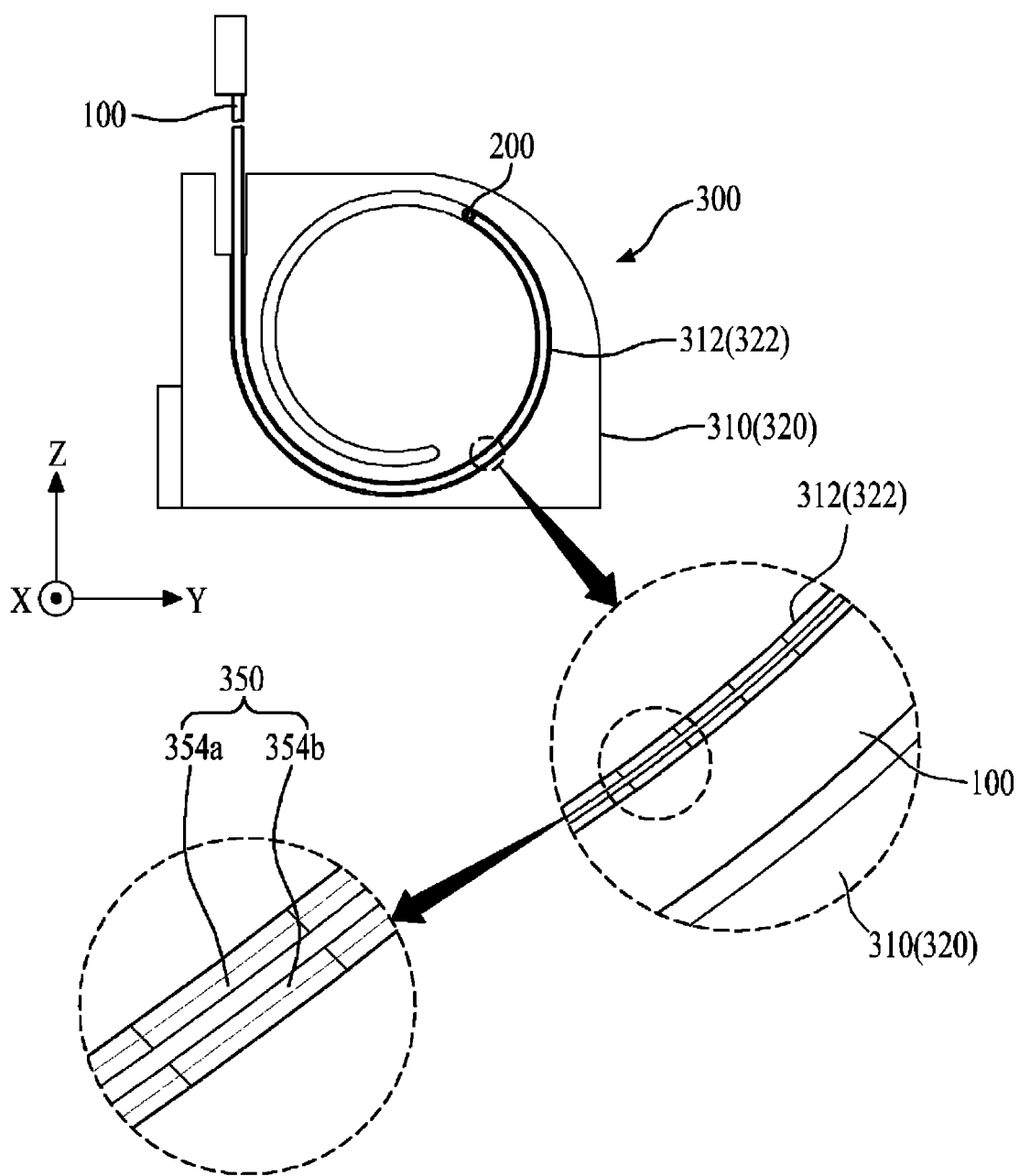
FIG. 17 is a view explaining another embodiment of a panel sliding guide in the flexible display apparatus according to the present invention.

The panel sliding guide 350 according to another embodiment, as exemplarily illustrated in FIG. 17, is adapted to guide the sliding of the flexible display module 100 in a non-contact manner using the repulsion of magnets, without physical contact with the flexible display module 100. To this end, the panel sliding guide 350 according to another embodiment may include a first repulsive member 354a installed to each of the sliding guide members 312 and 322 and a second repulsive member 354b installed to the flexible display module 100 so as to overlap with the first repulsive member 354a.

The first repulsive member 354a creates a magnetic field that is applied to the flexible display module 100. For example, the first repulsive member 354a according to one embodiment may include a plurality of permanent magnets each taking the form of a stack of an N-pole and an S-pole. The permanent magnets are successively arranged at the sliding guide member 312 and 322 such that the N-poles face the flexible display module 100. In another embodiment, the first repulsive member 354a may include a rubber magnet which takes the form of a stack of an N-pole and an S-pole and is installed to the sliding guide member 312 and 322 such that the N-pole faces the flexible display module 100.

The second repulsive member 354b creates a magnetic field that is applied to the sliding guide member 312 and 322. For example, the second repulsive member 354b according to one embodiment may include a plurality of permanent magnets each taking the form of a stack of an N-pole and an S-pole. The permanent magnets are successively arranged at the flexible display module such that the N-poles face the sliding guide member 312 and 322. In another embodiment, the second repulsive member 354b may include a rubber magnet which takes the form of a stack of an N-pole and an S-pole and is installed to the flexible display module 100 such that the N-pole faces the sliding guide member 312 and 322.

The panel sliding guide 350 according to anther embodiment as described above is adapted to guide the flexible display module 100 using the repulsive force generated by the first and second repulsive members 354a and 354b upon the sliding of the flexible display module 100 without physical contact with the flexible display module 100, thereby preventing problems due to friction between the flexible display module 100 and the sliding guide member 312 and 322 as well as the generation of noise upon the sliding of the flexible display module 100.

Figure 18:
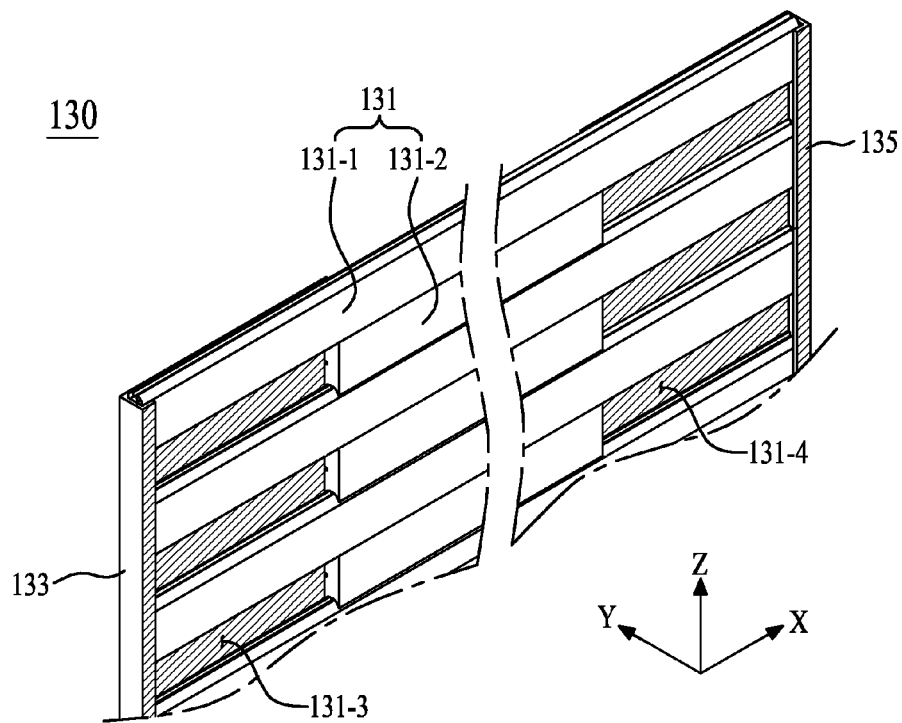
FIG. 18 is a view explaining a rear cover of the second embodiment in the flexible display apparatus according to the present invention.
Figure 19:
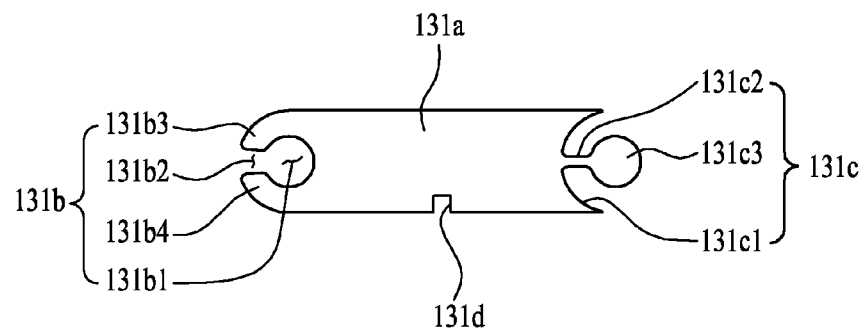
FIG. 19 is a sectional view explaining first and second support bars illustrated in FIG. 18.

FIG. 18 is a view explaining a rear cover of the second embodiment in the flexible display apparatus according to the present invention, and FIG. 19 is a sectional view explaining first and second support bars illustrated in FIG. 18.

Referring to FIGS. 18 and 19, the rear cover 130 according to the second embodiment includes the panel support unit 131, the first side protective cover 133, and the second side protective cover 135.

The panel support unit 131 may include a plurality of first and second support bars 131-1 and 131-2, which are rotatably connected to one another to cover the rear surface of the flexible display panel 110 while supporting the rear surface of the flexible display panel 110.

The first support bars 131-1 are formed to have a first length that is longer than the length of the flexible display panel 110 by a predetermined length and are arranged in parallel with one another by a constant distance.

The second support bars 131-2 are located respectively between the first support bars 131-1 and are rotatably connected to the respective neighboring first support bars 131-1. The second support bars 131-2 have a second length shorter than the first length of the first support bars 131-1 and, more specifically, have a length shorter than the length of the flexible display panel 110 by a predetermined length.

The first side protective cover 133 is configured to surround the front surface edge, the side surface and the rear surface of one side portion of each of the first support bars 131-1 protruding outward from one side surface of the respective second support bars 131-2, thereby absorbing external shock applied to one side surface of each of the first support bars 131-1. The first side protective cover 133 may be formed of an elastic material, for example, silicon or urethane. First slippage prevention spaces 131-3 are defined between one side portions of the respective first support bars 13-1 protruding outward from one side surfaces of the respective second support bars 131-2. Bending portions of the first side protective cover 133 are received in the first slippage prevention spaces 131-3 upon the rotation of the respective first support bars 131-1, which may prevent slippage between the first side protective cover 133 and the rear cover 130.

The second side protective cover 135 is configured to surround the front surface edge, the side surface and the rear surface of the other side portion of each of the first support bars 131-1 protruding outward from the other side surface of the respective second support bars 131-2, thereby absorbing external shock applied to the other side surface of each of the first support bars 131-1. The second side protective cover 135 may be formed of the same material as the first side protective cover 133. Second slippage prevention spaces 131-4 are defined between the other side portions of the respective first support bars 13-1 protruding outward from the other side surfaces of the respective second support bars 131-2. Bending portions of the second side protective cover 135 are received in the second slippage prevention spaces 131-4 upon the rotation of the respective first support bars 131-1, which may prevent slippage between the second side protective cover 135 and the rear cover 130.

Each of the first and second support bars 131-1 and 131-2 includes a body 131a, a first connection portion 131b and a second connection portion 131c.

The body 131a has a rectangular shape to have a length corresponding to the length of each first support bar 131-1 or each second support bar 131-2. The body 131a may be formed of a plastic material. In addition, the body 131a may have a longitudinal hollow region (not illustrated). The hollow region reduces the weight of the body 131a and, consequently, reduces the weight of the rear cover 130.

The first connection portion 131b is provided at one side of the body 131a and is rotatably connected to the second connection portion 131c of the neighboring support bar 131-1 or 131-2. In one embodiment, the first connection portion 131b has a hinge insertion hole 131b1 and a hinge passage hole 131b2.

The hinge insertion hole 131b1 is longitudinally perforated in an one side edge portion of the body 131a.

An outer region of the hinge insertion hole 131b1 is exposed outward through the hinge passage hole 131b2. As such, a pair of rotation protrusions 131b3 and 131b4 is formed at one side surface of the body 131a so as to face each other with the hinge passage hole 131b2 interposed therebetween. Here, any one of the two rotation protrusions 131b3 and 131b4 may be omitted and, in this case, the first connection portion 131b may have a hook shape.

The second connection portion 131c is provided at the other side of the body 131a so as to be rotatably connected to the first connection portion 131b of the neighboring support bar 131-1 or 131-2. In one embodiment, the second connection portion 131c includes a rotation guide surface 131c1, a rotation stopper 131c2, and a hinge shaft 131c3. The second connection portion 131c may have a "Ω"-shaped cross section for connection with the first connection portion 131b of the neighboring support bar 131-1 or 131-2.

The rotation guide surface 131c1 is indented from the other side surface of the body 131a to have a constant curvature. At this time, the rotation guide surface 131c1 may have the same curvature as the curvature of the rotation protrusions 131b3 and 131b4 formed at the first connection portion 131b.

The rotation stopper 131c2 protrudes from a middle portion of the rotation guide surface 131c1. At this time, the length of the rotation stopper 131c2 is longer than the length of the hinge passage hole 131b2 of the first connection portion 131b by a predetermined length. The rotation stopper 131c2 constrains the rotation of the rotation protrusions 131b3 and 131b4 provided at the first connection portion 131b when rotated along with the first connection portion 131b of the neighboring support bar 131-1 or 131-2, thereby limiting the rotation angle of the neighboring support bar 131-1 or 131-2.

The hinge shaft 131c3 is provided at a distal end of the rotation stopper 131c2. As the hinge shaft 131c3 is inserted into the hinge insertion hole 131b1 by passing through the hinge passage hole 131b2 of the first connection portion 131b, the neighboring support bars 131-1 and 131-2 are rotatably connected to each other. The hinge shaft 131c3 may take the form of a cylinder parallel to the longitudinal direction of the body 131a.

Consequently, the first and second connection portions 131b and 131c have opposite shapes for the rotatable connection of the neighboring support bars 131-1 and 131-2.

In addition, each of the first and second support bars 131-1 and 131-2 may have a bending prevention groove 131d formed in the rear surface of the body 131a.

The bending prevention groove 131d is indented in the rear surface of the body 131a to extend in the longitudinal direction of the body 131a. The bending prevention groove 131d increases the rigidity of the body 131a to minimize the bending of the body 13a. In addition, the bending prevention groove 131d serves to improve the assembly efficiency of the first and second support bars 131-1 and 131-2.

Figure 20:
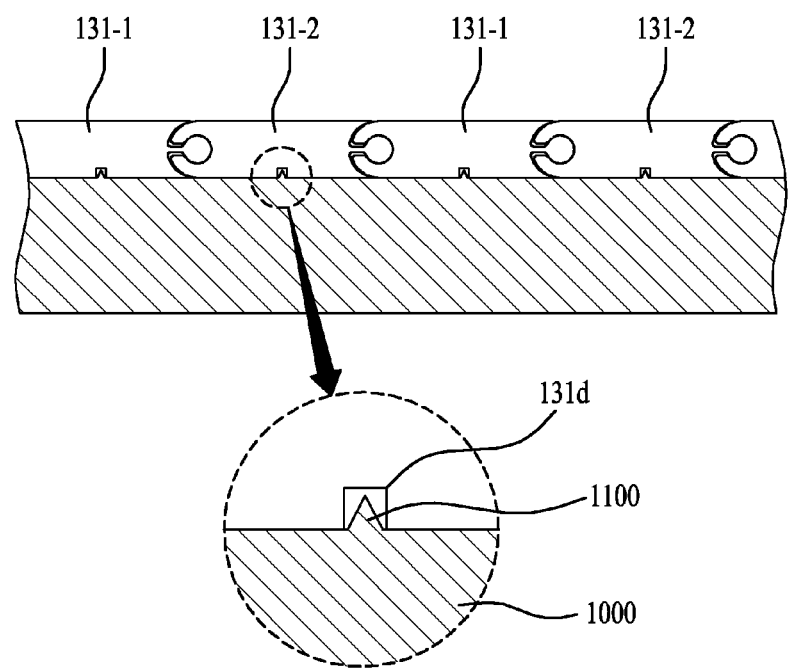
FIG. 20 is a view explaining an assembly method of a panel support unit in the rear cover according to the present invention.

FIG. 20 is a view explaining an assembly method of a panel support unit in the rear cover according to the present invention.

The assembly method of the panel support unit according to the present invention will be described below with reference to FIG. 20.

First, there is provided a jig 1000 that includes a plurality of protruding alignment lines 1100 spaced apart from one another by a constant distance. Here, the protruding alignment lines 1100 may protrude from the upper surface of the jig 1000 so as to be inserted into the bending prevention grooves 131d formed in the support bars. The protruding alignment lines 1100 may have a triangular cross section to ensure easy insertion thereof into the bending preventing grooves 131d. The distance between the protruding alignment lines 1100 may correspond to a distance between the bending prevention grooves 131d formed in the respective neighboring support bars connected to each other, i.e. the first and second support bars 131-1 and 131-2.

Subsequently, the first and second support bars 131-1 and 131-2 are alternately arranged on the protruding alignment lines 1100 so as to be alternately connected to one another.

Subsequently, among the first and second support bars 131-1 and 131-2 arranged on the jig 1000 so as to be alternately and successively connected to one another, the respective first support bars 131-1 are connected at one side portion and the other side portion thereof to respective side protective covers. In this way, the assembly process of the panel support unit 131, including the first and second support bars 131-1 and 131-2 successively connected to one another, is completed.

The assembly method of the panel support unit according to the present invention as described above may improve the assembly efficiency of the first and second support bars 131-1 and 131-2 through the use of the jig 1000 having the protruding alignment lines 1100 inserted into the bending preventing grooves 131d of the respective first and second support bars 131-1 and 131-2.

Figure 21:
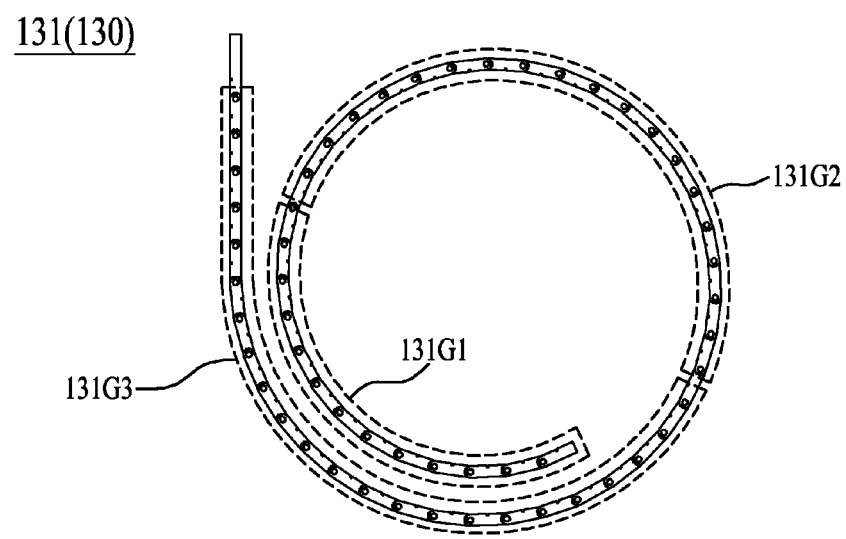
FIG. 21 is a view explaining an alternative embodiment of the panel support unit in the rear cover according to the second embodiment of the present invention.
Figure 22A:
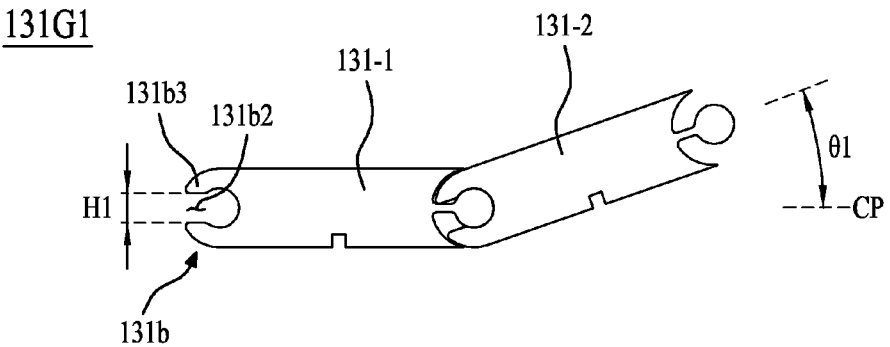
FIGS. 22A to 22C are sectional views explaining the rotation angle of support bars on a per support group basis illustrated in FIG. 21.
Figure 22B:
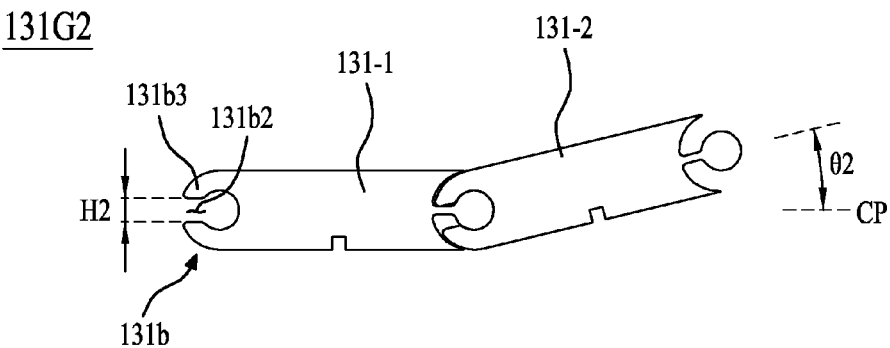
Figure 22C:
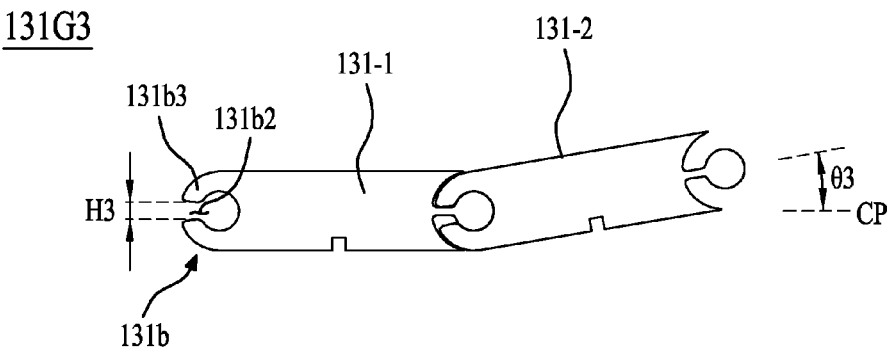

FIG. 21 is a view explaining an alternative embodiment of the panel support unit in the rear cover according to the second embodiment of the present invention, and FIGS. 22A to 22C are sectional views explaining the rotation angle of support bars on a per support group basis illustrated in FIG. 19.

Referring to FIG. 21, the panel support unit 131 according to the alternative embodiment may include first to third support groups 131G1, 131G2 and 131G3, each having two or more support bars 131-1 and 131-2 connected to each other, which are sorted based on variation in the sliding curvature of the spiral sliding path.

The first support group 131G1 includes the first and second support bars 131-1 and 131-2 to support a lower portion of the flexible display panel 110. At this time, the lower portion of the flexible display panel 110 has a relatively small first curvature value according to the spiral sliding path upon the winding of the flexible display module 100. As such, as exemplarily illustrated in FIG. 22A, the maximum rotation angle of the support bars 131-1 and 131-2 included in the first support group 131G1 may be set to a first rotation angle θ1 corresponding to the first curvature value. To this end, the hinge passage hole 131b2 formed in the first connection portion 131b of each support bar 131-1 and 131-2 included in the first support group 131G1 is set to a first height H1 and, accordingly, the rotation angle of the rotation protrusion 131b3 formed at the first connection portion 131b is limited to the first rotation angle θ1 on the basis of the center point CP of the hinge passage hole 131b2.

The second support group 131G2 includes the first and second support bars 131-1 and 131-2 to support a middle portion of the flexible display panel 110. At this time, the middle portion of the flexible display panel 110 has a second curvature value greater than the first curvature value according to the spiral sliding path upon the winding of the flexible display module 100. As such, as exemplarily illustrated in FIG. 22B, the maximum rotation angle of the support bars 131-1 and 131-2 included in the second support group 131G2 may be set to a second rotation angle θ2 which corresponds to the second curvature value and is smaller than the first rotation angle θ1. To this end, the hinge passage hole 131b2 formed in the first connection portion 131b of each support bar 131-1 and 131-2 included in the second support group 131G2 is set to a second height H2 which is lower than the first height H1 and, accordingly, the rotation angle of the rotating protrusion 131b3 formed at the first connection portion 131b is limited to the second rotation angle θ2 on the basis of the center point CP of the hinge passage hole 131b2.

The third support group 131G3 includes the first and second support bars 131-1 and 131-2 to support an upper portion of the flexible display panel 110. At this time, the upper portion of the flexible display panel 110 has a third curvature value greater than the second curvature value according to the spiral sliding path upon the winding of the flexible display module 100. As such, as exemplarily illustrated in FIG. 22C, the maximum rotation angle of the support bars 131-1 and 131-2 included in the third support group 131G3 may be set to a third rotation angle θ3 which corresponds to the third curvature value and is smaller than the second rotation angle θ2. To this end, the hinge passage hole 131b2 formed in the first connection portion 131b of each support bar 131-1 and 131-2 included in the third support group 131G3 is set to a third height H3 which is lower than the second height H2 and, accordingly, the rotation angle of the rotating protrusion 131b3 formed at the first connection portion 131b is limited to the third rotation angle θ3 on the basis of the center point CP of the hinge passage hole 131b2.

As described above, in the panel support unit 131 according to the alternative embodiment, the rotation angles of the support bars 131-1 and 131-2 of the respective support groups 131G1, 131G2 and 131G3 are differently set based on variation in the sliding curvature of the spiral sliding path, which enables the flexible display panel 110 to be easily wound or unwound in a spiral form.

Figure 23:
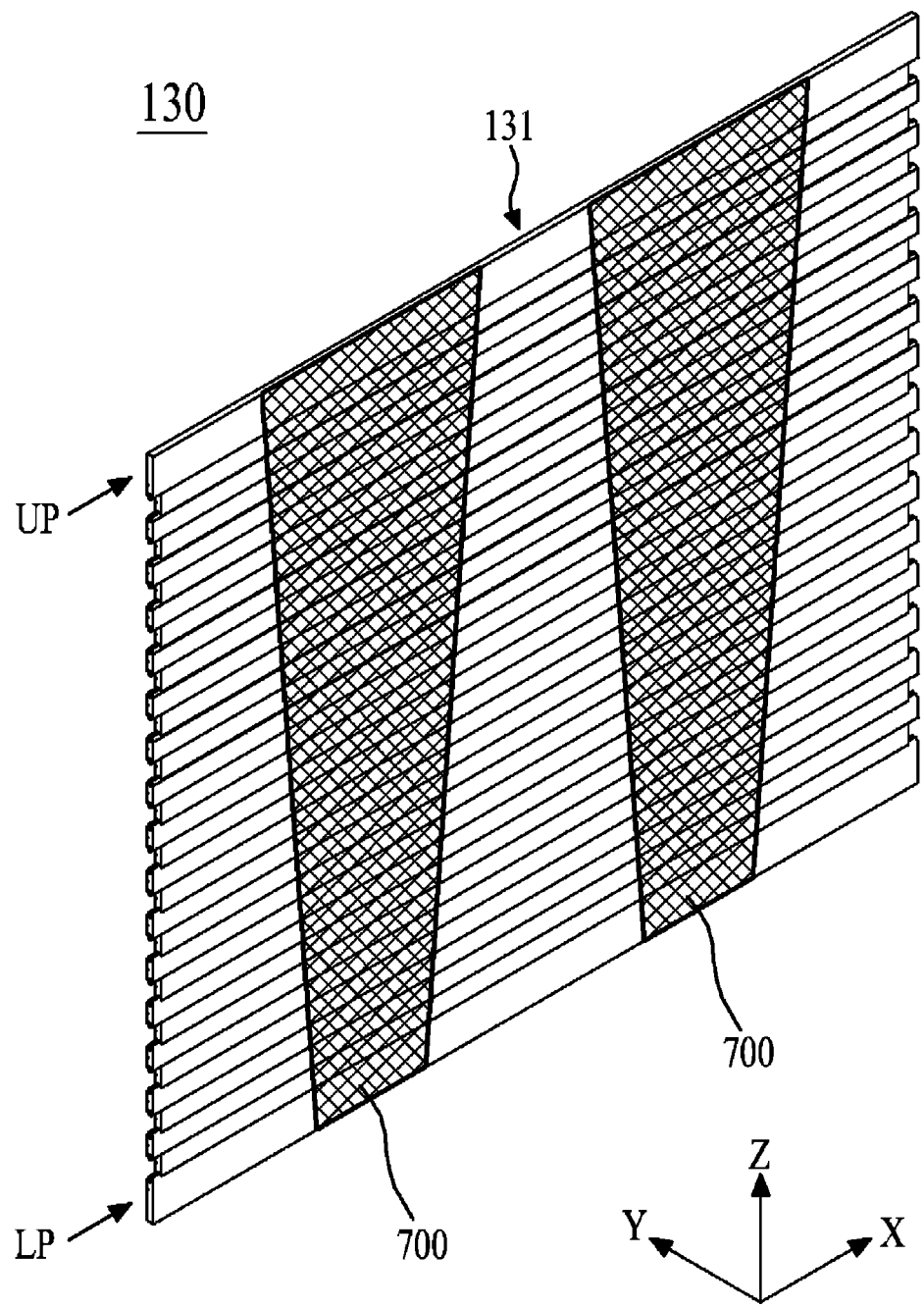
FIG. 23 is a view explaining one embodiment of a curvature restriction member in the flexible display apparatus according to the embodiment of the present invention.

FIG. 23 is a view explaining one embodiment of a curvature restriction member in the flexible display apparatus according to the present invention.

Referring to FIG. 23, at least one curvature restriction member 700 according to one embodiment is attached to the rear surface of the above-described rear cover 130 to restrict the curvature of the rear cover 130. The curvature restriction member 700 may be attached to the rear surface of the rear cover 130, i.e. the panel support unit 131 and may be gradually increased in area from the bottom to the top of the rear cover 130. That is, the curvature restriction member 700 may have a trapezoidal plan shape. In this case, the upper side of the curvature restriction member 700 having a first length may be attached to an upper portion UP of the rear cover 130 and the lower side of the curvature restriction member 700 having a second length shorter than the first length may be attached to a lower portion LP of the rear cover 130. For example, the curvature restriction member 700 may be an adhesive member including an adhesive tape or an adhesive sheet.

For example, two or more curvature restriction members 700 may be attached to the rear surface of the panel support unit 131 so as to be spaced apart from each other by a constant distance, or one curvature restriction member 700 may be attached to a middle portion of the panel support unit 131 in the longitudinal direction X of the rear cover 130.

As described above, the curvature restriction member 700 limits respective different regions of the rear cover 130 to different curvatures based on the difference between the attachment areas thereof at the different attachment positions thereof, thereby allowing the rear cover 130 to bend at a curvature corresponding to the spiral sliding path. In this way, the present invention is capable of limiting the bending curvature of the rear cover 130 to correspond to the spiral sliding path via a simplified method using the difference in the attachment areas of the adhesive member.

Figure 24:
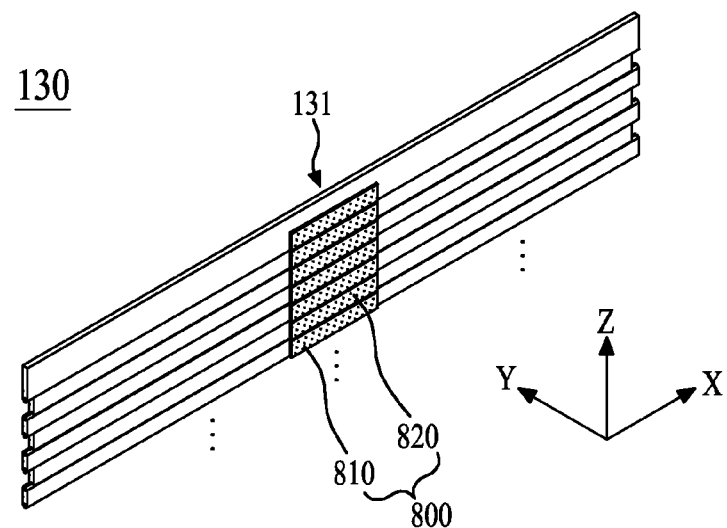
FIG. 24 is a view explaining another embodiment of a panel attachment member in the flexible display apparatus according to the embodiment of the present invention.

FIG. 24 is a view explaining another embodiment of a panel attachment member in the flexible display apparatus according to the present invention.

Referring to FIG. 24, the panel attachment member 800 according to another embodiment is attached to a panel attachment surface of the rear cover 130 to attach the rear cover 130 to the rear surface of the flexible display panel 110 using magnetic force. To this end, the panel attachment member 800 according to another embodiment is adapted to attach the rear cover 130 to the rear surface of the flexible display panel 110 using the magnetic force generated as first and second magnets 810 and 820 having opposite polarities are strongly attached to and held by each other, thereby improving the vertical flatness of the vertically upright flexible display panel 110. For example, the panel attachment member 800 according to another embodiment may include a magnet array consisting of first magnets 810 having a first polarity and second magnets 820 having a second polarity opposite to the first polarity, which are alternately attached to the rear surface of the rear cover 130.

When the panel attachment member 800 is configured as a magnet array, a metal plate is provided at the rear surface of the flexible display panel 110.

The panel attachment member 800 may further improve the vertical flatness of the vertically upright flexible display panel 110 when the magnets 810 and 820 have a relatively great thickness.

Figure 25:
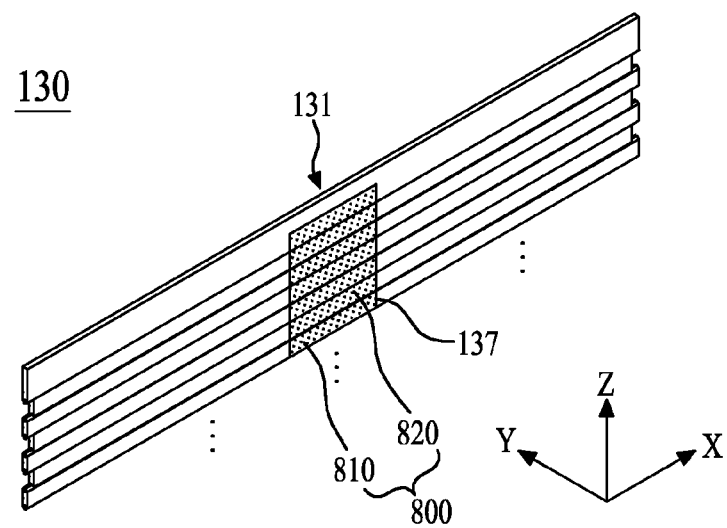
FIG. 25 is a view explaining an alternative embodiment of the panel attachment member illustrated in FIG. 24.

In addition, the panel attachment member 800, as exemplarily illustrated in FIG. 25, may be inserted into the magnet insertion grooves 137 formed in the respective support bars of the rear cover 130, which may result in a reduction in the thickness of the flexible display module 100.

The magnet array of the panel attachment member 800 may be installed in at least one row at the rear surface of the rear cover 130, or may be installed along an edge portion of the rear surface of the rear cover 130.

Figure 26:
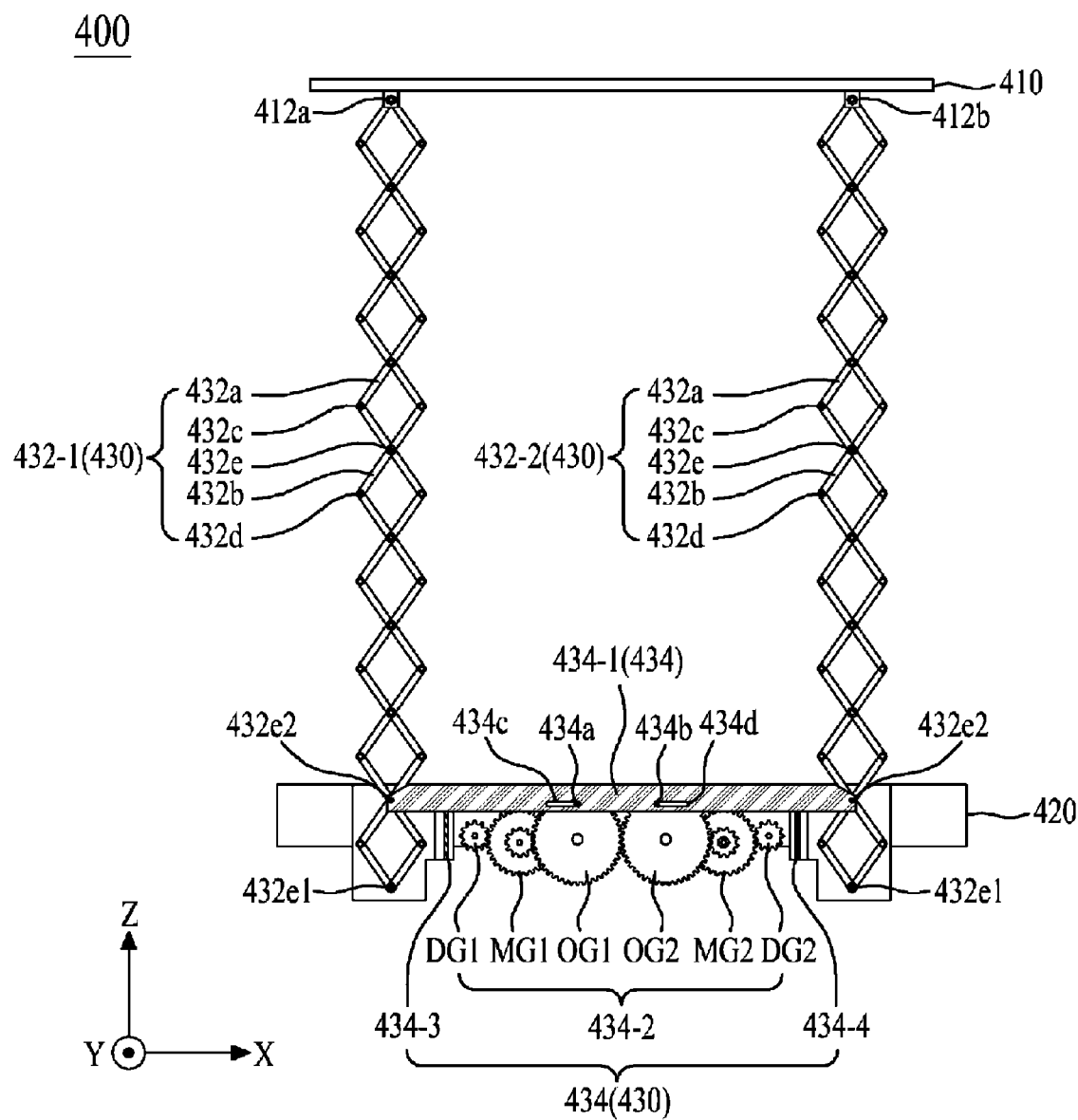
FIG. 26 is a view explaining another embodiment of a panel elevating module in the flexible display apparatus according to the embodiment of the present invention.
Figure 27:
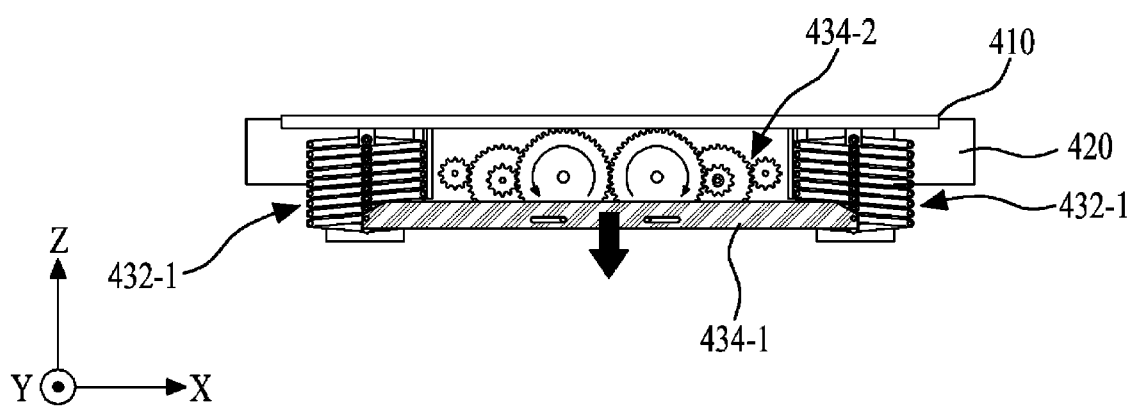
FIG. 27 is a view illustrating a downwardly moved state of the support frame caused by the winding driving of a frame elevating unit illustrated in FIG. 26.

FIG. 26 is a view explaining another embodiment of the panel elevating module in the flexible display apparatus according to the present invention, and FIG. 27 is a view illustrating a downwardly moved state of the support frame caused by the winding driving of the frame elevating unit illustrated in FIG. 26.

Referring to FIGS. 26 and 27, the panel elevating module 400 according to another embodiment includes the support frame 410, the connection frame 420, and the frame elevating unit 430.

Figure 5:
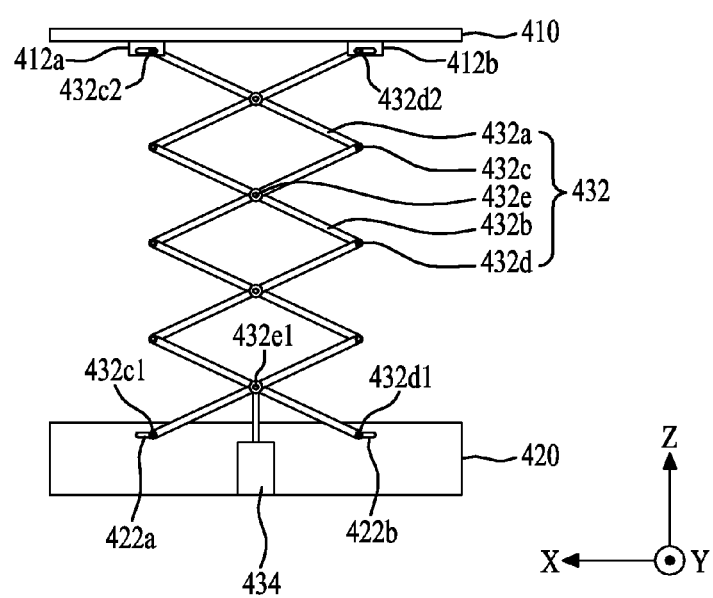
FIG. 5 is a view explaining a panel elevating module illustrated in FIG. 3.
Figure 6:
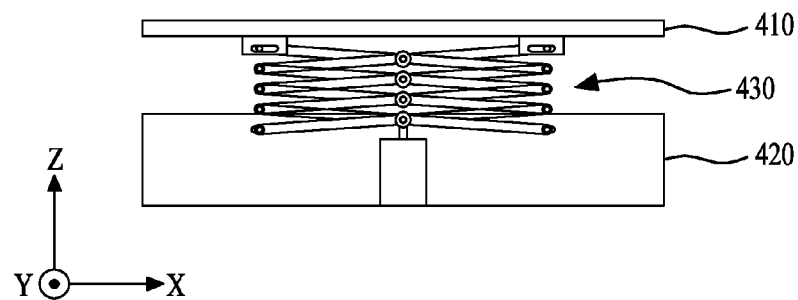
FIG. 6 is a view illustrating a downwardly moved state of a support frame caused by the winding driving of a frame elevating unit illustrated in FIG. 5.

The support frame 410 and the connection frame 420 are identical to those of FIG. 5 and, thus, a repeated description thereof will be omitted below.

The frame elevating unit 430 is installed to the connection frame 420 to vertically move the support frame 410 and, consequently, to vertically move the flexible display module 100. In one embodiment, the frame elevating unit 430 may include first and second length variable members 432-1 and 432-2 and the drive member 434.

Each of the first and second length variable members 432-1 and 432-2 may take the form of a pantograph. In one embodiment, each of the first and second length variable members 432-1 and 432-2 includes the first links 432a, the second links 432b, and the first to third hinge pins 432c, 432d and 432e. This configuration is identical to that of the length variable member 432 illustrated in FIG. 5 and, thus, a repeated description thereof will be omitted below.

Accordingly, the first and second length variable members 432-1 and 432-2 implement the balanced vertical movement of the support frame 410 as the respective first and second links 432a and 432b are rotated about the first to the third hinge pins 432c, 432d and 432e.

The drive member 434 is adapted to vertically move the support frame 410 by simultaneously varying the lengths of the respective first and second length variable members 432-1 and 432-2, thereby vertically moving the flexible display module 100. That is, the drive member 434 folds or unfolds the first and second links 432a and 432b of the respective first and second length variable members 432-1 and 432-2 by vertically moving a second-lowermost third hinge pin 432e2 adjacent to the lowermost third hinge pin 432e1 among the third hinge pins 432e, thereby simultaneously evenly expanding or contracting the lengths of the first and second length variable members 432-1 and 432-2.

In one embodiment, the drive member 434 may include an elevating plate 434-1, a gear assembly 434-2, and a pair of elevating guide members 434-3 and 434-4.

The elevating plate 434-1 is connected between the neighboring second-lowermost third hinge pins 432e2, adjacent to the lowermost hinge pins 432e1, for the respective first and second length variable members 432-1 and 432-2. The elevating plate 434-1 vertically moves the neighboring second-lowermost third hinge pins 432e2 for the respective first and second length variable members 432-1 and 432-2 via the driving of the gear assembly 434-2, thereby simultaneously expanding or contracting the lengths of the respective first and second length variable members 432-1 and 432-2.

The gear assembly 434-2 vertically moves the elevating plate 434-1 via the driving of a rotation motor (not illustrated) installed to the connection frame 420. For example, the gear assembly 434-2 may move the elevating plate 434-1 upward via the forward rotation of the rotation motor and move the elevating plate 434-1 downward via the reverse rotation of the rotation motor.

In one embodiment, the gear assembly 434-2 may include first and second drive gears DG1 and DG2, first and second intermediate gears MG1 and MG2, first and second output gears OG1 and OG2, first and second cams 434a and 434b, and first and second cam slots 434c and 434d.

The first drive gear DG1 is installed to one side portion of the connection frame 420 and is rotated via the rotation of a first rotation motor (not illustrated) installed to the connection frame 420.

The second drive gear DG2 is installed to the other side portion of the connection frame 420 and is rotated via the rotation of a second rotation motor (not illustrated) installed to the connection frame 420.

The first intermediate gear MG1 is installed to the connection frame 420 so as to engage with the first drive gear DG1 and is rotated in connection with the rotation of the first drive gear DG1. At this time, the first intermediate gear MG1 may be a speed reduction gear.

The second intermediate gear MG2 is installed to the connection frame 420 so as to engage with the second drive gear DG2 and is rotated in connection with the rotation of the second drive gear DG2. At this time, the second intermediate gear MG2 may be a speed reduction gear in the same manner as the first intermediate gear MG1.

The first output gear OG1 is installed to the connection frame 420 so as to engage with the first intermediate gear MG1 and is rotated in connection with the rotation of the first intermediate gear MG1.

The second output gear OG2 is installed to the connection frame 420 so as to simultaneously engage with the second intermediate gear MG2 and the second output gear OG1 and is rotated in connection with the rotation of the second intermediate gear MG2.

The first cam 434a is installed to one side of the front surface of the first output gear OG1 at a given height so as to be moved in a circular track according to the rotation of the first output gear OG1.

The second cam 434b is installed to one side of the front surface of the second output gear OG2 at a given height so as to be moved in a circular track according to the rotation of the second output gear OG2.

The first cam slot 434c is formed in the elevating plate 434-1 on the first output gear OG1 such that the first cam 434a is movably inserted into the first cam slot 434c. The first cam slot 434c may be a rectangular slot.

The second cam slot 434d is formed in the elevating plate 434-1 on the second output gear OG2 such that the second cam 434b is movably inserted into the second cam slot 434d. The second cam slot 434d may be a rectangular slot.

In the gear assembly 434-2 according to one embodiment as described above, the respective gears DG1, DG2, MG1, MG2, OG1 and OG2 are rotated in connection with the rotation of the respective first and second rotation motors synchronized with each other so as to move the respective first and second cams 434a and 434b, thereby vertically moving the elevating plate 434-1 according to the movement of the respective first and second cams 434a and 434b. For example, the gear assembly 434-2 moves the elevating plate 434-1 upward as the respective first and second cams 434a and 434b are moved clockwise via the forward rotation of the respective first and second output gears OG1 and OG2 (the unwinding operation of the flexible display module 100) in connection with the forward rotation of the respective first and second rotation motors. In addition, the gear assembly 434-2 moves the elevating plate 434-1 downward as the respective first and second cams 434a and 434b are moved counterclockwise via the reverse rotation of the respective first and second output gears OG1 and OG2 in connection with the reverse rotation of the respective first and second rotation motors (the winding operation of the flexible display module 100).

The elevating guide members 434-3 and 434-4 are installed to the connection frame 420 in parallel with each other to guide the vertical movement of the elevating plate 434-1. In one embodiment, the elevating guide member 434-3 and 434-4 may include guide rails formed in the connection frame 420 in the vertical direction Z and guide grooves formed in the rear surface of the elevating plate 434-1 to overlap with the guide rails.

In one embodiment, as exemplarily illustrated in FIG. 27, for the unwinding of the flexible display module 100, the drive member 434 folds the first and second links 432a and 432b of the respective first and second length variable members 432-1 and 432-2 by downwardly moving the second-lowermost third hinge pins 432e2 via the downward movement of the elevating plate 434-1 in connection with the reverse rotation of the gear assembly 434-2, thereby downwardly moving the support frame 410 to cause the flexible display module 100 to be spirally wound inside the frame module 300. Conversely, in one embodiment, as exemplarily illustrated in FIG. 26, for the unwinding of the flexible display module 100, the drive member 434 unfolds the first and second links 432a and 432b of the respective first and second length variable members 432-1 and 432-2 by upwardly moving the second-lowermost third hinge pins 432e2 via the upward movement of the elevating plate 434-1 in connection with the forward rotation of the gear assembly 434-2, thereby upwardly moving the support frame 410 to cause the spirally wound flexible display module 100 to be unwound to stand vertically upright.

As described above, the panel elevating module 400 according to another embodiment is capable of achieving the balanced vertical movement of the flexible display module 100 by simultaneously varying the lengths of the first and second length variable members 432-1 and 432-2 using the gear assembly 434-2 and improving the vertical flatness of the vertically upright flexible display panel 110 by supporting the flexible display module 100 using the first and second length variable members 432-1 and 432-2.

Although the flexible display apparatus according to the present invention has been described above as being a large flexible display apparatus, the present invention is not limited thereto and may be applied to all sizes of flexible display apparatus.

As is apparent from the above description, the present invention has the following effects.

First, it is possible to achieve the easy winding or unwinding of a flexible display module via the driving of a panel elevating module.

Second, as the flexible display module is wound or unwound in a spiral form, it is possible to prevent physical contact between bending surfaces of a flexible display panel, which may result in the improved reliability of the flexible display panel.

Third, it is possible to reduce the thickness of the flexible display module configured to be drawn outward as a result of receiving a panel drive circuit unit inside a frame module.

In addition to the effects of the present invention as mentioned above, other features and advantages of the present invention will be clearly understood by those skilled in the art from the above description.

The present invention as described above are not limited to the above-described embodiments and the accompanying drawings and those skilled in the art will clearly appreciate that various modifications, deformations, and substitutions are possible without departing from the scope and spirit of the invention. Hence, the scope of the present invention is defined by the claims as will be described below and all variations or alternations derived from the meanings and scope of the claims and equivalent concepts thereof should be construed as being included in the scope of the present invention.

What is claimed is:

1. A flexible display apparatus comprising:
    a flexible display module;
    a frame module having a guiding path;
    a panel elevating module connected to an upper side of the flexible display module and configured to elevate the flexible display module; and
    a guiding shaft connected to a lower side of the flexible display module, the guiding shaft being configured to move along the guiding path via vertical movement of the flexible display module to guide the winding of the flexible display module to the frame module and to guide the unwinding of the flexible display module from the frame module,
    wherein the guiding path has a spiral shape.

2. The flexible display apparatus according to claim 1, wherein the flexible display module is wound in a spiral form and received in the frame module via movement of the guiding shaft along the guiding path.

3. The flexible display apparatus according to claim 1, wherein the frame module includes:
    a first support member having a first guide member configured to support a first end of the guiding shaft; and
    a second support member having a second guide member configured to support a second end of the guiding shaft, the second support member being disposed in parallel with the first support member, and
    wherein each of the first guide member and the second guide member is a spiral slit defining the spiral shape of the guiding path.

4. The flexible display apparatus according to claim 3, further comprising a guiding induction unit coupled to each end of the guiding shaft.

5. The flexible display apparatus according to claim 4, wherein the guiding induction unit includes a bearing member coupled to the guiding shaft and located in the spiral slit.

6. The flexible display apparatus according to claim 4, wherein the guiding induction unit includes:
    a support holder coupled to the guiding shaft; and
    a pair of bearing members connected to an inner side surface of the support holder and arranged in parallel with each other with the guiding shaft interposed between the pair of bearing members, the bearing members being located in the spiral slit.

7. The flexible display apparatus according to claim 6, wherein the guiding induction unit further includes a plurality of follower bearing members connected to both side surfaces of the support holder to have a second rotation axis intersecting with a first rotation axis of the bearing members, the follower bearing members being configured to come into contact with an outer side surface of a corresponding one of the first support member and the second support member.

8. The flexible display apparatus according to claim 3, further comprising a panel guide connected to the first guide member and the second guide member, the panel guide being configured to contact the flexible display module and guide the movement of the flexible display module.

9. The flexible display apparatus according to claim 3, further comprising a panel guide connected to the first guide member, the second guide member and the flexible display module so as to overlap with the guiding path, the panel guide including a plurality of magnets configured to guide the movement of the flexible display module in a non-contact manner using a repulsive force of the magnets.

10. The flexible display apparatus according to claim 3, further comprising a module connection member configured to connect the lower side of the flexible display module to the guiding shaft,
    wherein the flexible display module includes:
        a flexible display panel;
        a panel drive circuit unit including a control board connected to the flexible display panel; and
        a rear cover attached to a rear surface of the flexible display panel, the rear cover being connected to the guiding shaft through the module connection member.

11. The flexible display apparatus according to claim 10, further comprising a circuit cover configured to cover the panel drive circuit unit,
    wherein the panel drive circuit unit is connected to the upper side of the flexible display panel and covered with the circuit cover.

12. The flexible display apparatus according to claim 10, further comprising a board rotation module located between the first support member and the second support member, the board rotation module being configured to support the control board and to rotate the control board via the movement of the guiding shaft,
    wherein the panel drive circuit unit is connected to the lower side of the flexible display panel.

13. The flexible display apparatus according to claim 12, wherein the board rotation module includes:
    a rotating shaft rotatably located between the first support member and the second support member; and
    a board bracket located between the guiding shaft and the rotating shaft to support the control board,
    wherein the board bracket is moved while being rotated about the rotating shaft via the movement of the guiding shaft.

14. The flexible display apparatus according to claim 13, wherein the board bracket includes:
    a bottom portion configured to support the control board; and
    first and second sidewall portions provided in parallel with each other at both edges of the bottom portion, and
    wherein a first side of each of the first and second sidewall portions is supported by the guiding shaft, and a second side of each of the first and second sidewall portions is supported by the rotating shaft.

15. The flexible display apparatus according to claim 14, wherein the board bracket further includes a rectangular slot formed in the second side of each of the first and second sidewall portions, and
wherein the rotating shaft passes through the rectangular slot of each of the first and second sidewall portions.

16. The flexible display apparatus according to claim 15, wherein the board rotation module further includes:
a first bracket movement guide coupled to the rotating shaft, the first bracket movement guide extending into the rectangular slot of the first sidewall portion to guide movement of the board bracket; and
a second bracket movement guide coupled to the rotating shaft, the second bracket movement guide extending into the rectangular slot of the second sidewall portion to guide movement of the board bracket.

17. The flexible display apparatus according to claim 16, wherein the board rotation module further includes a torsion spring located between the first bracket movement guide and the rotating shaft to rotate the rotating shaft using an elastic restoration force.

18. The flexible display apparatus according to claim 10, wherein the rear cover includes a panel support unit configured to support the rear surface of the flexible display panel, and
wherein the panel support unit includes a plurality of support bars rotatably connected to one another.

19. The flexible display apparatus according to claim 18, wherein the panel support unit includes:
a first support group including two or more support bars connected to one another; and
a second support group including two or more support bars connected to one another,
wherein the support bars of the first support group have a maximum rotation angle that is different from a maximum rotation angle of the support bars of the second support group.

20. The flexible display apparatus according to claim 19, wherein the maximum rotation angle of the support bars at the upper side of the flexible display panel is less than the maximum rotation angle of the support bars at the lower side of the flexible display panel.

21. The flexible display apparatus according to claim 10, wherein the rear cover includes a panel support unit configured to support the rear surface of the flexible display panel, and
wherein the panel support unit includes:
a plurality of first support bars having a first length;
a plurality of second support bars having a second length shorter than the first length, the second support bars being rotatably connected between the respective first support bars; and
side protective covers provided respectively at both side portions of the first support bars and protruding laterally from the second support bars.

22. The flexible display apparatus according to claim 21, further comprising at least one curvature restriction member attached to the panel support unit to restrict a curvature of the rear cover.

23. The flexible display apparatus according to claim 22, wherein the curvature restriction member includes an adhesive member having an area gradually increasing from the lower side of the rear cover to the upper side of the rear cover.

24. The flexible display apparatus according to claim 10, wherein the flexible display module further includes a panel attachment member configured to attach the rear cover to the rear surface of the flexible display panel using magnetic force.

25. The flexible display apparatus according to claim 10, wherein the panel elevating module includes:
a support frame coupled to the upper side of the flexible display module;
a connection frame connected to the first support member and the second support member; and
a frame elevating unit coupled to the connection frame to vertically move the support frame.

26. The flexible display apparatus according to claim 25, wherein the frame elevating unit includes:
a length variable member provided between the connection frame and the support frame; and
a drive member coupled to the connection frame to vary a length of the length variable member.

27. The flexible display apparatus according to claim 26, wherein the length variable member includes first and second length variable members provided in parallel with each other between the connection frame and the support frame,
wherein each of the first and second length variable members includes:
a plurality of first links;
a plurality of second links intersecting with respective ones of the first links;
a plurality of first hinge pins configured to rotatably interconnect and support the first links;
a plurality of second hinge pins configured to rotatably interconnect and support the second links; and
a plurality of third hinge pins configured to rotatably support intersections between the first links and the second links.

28. The flexible display apparatus according to claim 26, wherein lowermost ones of the third hinge pins for the respective first and second length variable members are coupled to the connection frame, and
wherein the drive member includes:
an elevating plate connected between third hinge pins located adjacent to the lowermost third hinge pins of the each of the first and second length variable members;
a gear assembly coupled to the connection frame to vertically move the elevating plate;
a rotation motor for driving the gear assembly; and
an elevating guide member coupled to the connection frame to guide vertical movement of the elevating plate.

29. A flexible display apparatus comprising:
a flexible display module;
a frame module having a guiding path;
a panel elevating module connected to an upper side of the flexible display module and configured to elevate the flexible display module;
a guiding shaft connected to a lower side of the flexible display module, the guiding shaft being configured to move along the guiding path via vertical movement of the flexible display module to guide the winding of the flexible display module to the frame module and to guide the unwinding of the flexible display module from the frame module; and
a module connection member configured to connect the lower side of the flexible display module to the guiding shaft,
wherein the guiding path has a spiral shape.

30. The flexible display apparatus according to claim 29, wherein the flexible display module includes:

a flexible display panel; and a rear cover attached to a rear surface of the flexible display panel, the rear cover being connected to the guiding shaft through the module connection member.

31. The flexible display apparatus according to claim 29, wherein the frame module includes:

a first support member having a first guide member configured to support a first end of the guiding shaft; and a second support member having a second guide member configured to support a second end of the guiding shaft, the second support member being disposed in parallel with the first support member, wherein each of the first guide member and the second guide member is a spiral slit defining the spiral shape of the guiding path.

* * * * *